US010509295B2

(12) United States Patent
Padmaraju et al.

(10) Patent No.: US 10,509,295 B2
(45) Date of Patent: Dec. 17, 2019

(54) BIAS CONTROL OF OPTICAL MODULATORS

(71) Applicant: Elenion Technologies, LLC, New York, NY (US)

(72) Inventors: Kishore Padmaraju, New York, NY (US); Thomas Wetteland Baehr-Jones, Arcadia, CA (US); Bernd-Harald Horst Jurgen Rohde, Munich (DE); Robert Palmer, Munich (DE); Matthew Akio Streshinsky, New York, NY (US); Marc Bohn, Gauting (DE); Torsten Wuth, Munich (DE)

(73) Assignee: Elenion Technologies, LLC, New York, NY (US)

( * ) Notice: Subject to any disclaimer, the term of this patent is extended or adjusted under 35 U.S.C. 154(b) by 28 days.

(21) Appl. No.: 15/459,066

(22) Filed: Mar. 15, 2017

(65) Prior Publication Data

US 2018/0267384 A1    Sep. 20, 2018

(51) Int. Cl.
G02F 1/225      (2006.01)
G02F 1/01       (2006.01)
G02F 1/21       (2006.01)
H04B 10/516     (2013.01)

(52) U.S. Cl.
CPC ............ *G02F 1/225* (2013.01); *G02F 1/0123* (2013.01); *G02F 2001/212* (2013.01); *H04B 10/516* (2013.01)

(58) Field of Classification Search
CPC .. G02F 1/225; G02F 2001/212; H04B 10/516
See application file for complete search history.

(56) References Cited

U.S. PATENT DOCUMENTS

| | | | | |
|---|---|---|---|---|
| 5,400,417 A | * | 3/1995 | Allie | G02F 1/0123 359/245 |
| 5,767,739 A | * | 6/1998 | Witte | H04S 1/007 329/306 |
| 6,671,079 B2 | * | 12/2003 | Fuller | H04B 10/5051 359/264 |

(Continued)

OTHER PUBLICATIONS

Gui et al., Auto bias control technique for optical OFDM transmitter with bias dithering, Optics Express, V. 21, N. 5, 2013.*

(Continued)

*Primary Examiner* — Peter Radkowski
(74) *Attorney, Agent, or Firm* — Stratford Managers Corporation

(57) ABSTRACT

An optical waveguide modulator with automatic bias control is disclosed. A dither signal is applied to the modulator bias and its signature detected in light tapped from an output of the modulator using a phase sensitive dither detector such as a lock-in amplifier. The detected signal is processed using pre-recorded information defining the direction of the detected signal change relative to a change in the modulator bias, and the bias is adjusted in the direction determined using the information. An IQ bias of a quadrature modulator is controlled by dithering bias settings of two inner modulators at different dither frequencies, and detecting an oscillation at a sum frequency.

8 Claims, 11 Drawing Sheets

(56) References Cited

U.S. PATENT DOCUMENTS

| | | | | |
|---|---|---|---|---|
| 6,687,451 | B1* | 2/2004 | Sikora | G02F 1/0123 398/187 |
| 7,369,290 | B1* | 5/2008 | Cox | G02F 1/0123 359/238 |
| 7,603,007 | B2 | 10/2009 | Terahara | |
| 7,715,732 | B2* | 5/2010 | Koh | G02F 1/0123 359/237 |
| 7,899,338 | B2 | 3/2011 | Hashimoto | |
| 7,907,324 | B2 | 3/2011 | Hoshida | |
| 7,986,885 | B2* | 7/2011 | Mamyshev | G02F 1/0123 398/188 |
| 8,050,351 | B2 | 11/2011 | Cho | |
| 8,401,399 | B2 | 3/2013 | Barton | |
| 8,670,676 | B2* | 3/2014 | Oberland | G02F 1/0123 398/195 |
| 8,849,129 | B2 | 9/2014 | Bhandare | |
| 9,116,368 | B2 | 8/2015 | Kawakami | |
| 9,705,603 | B1* | 7/2017 | Abbas | H04B 10/564 |
| 2003/0112487 | A1* | 6/2003 | Fuller | H04B 10/5051 359/239 |
| 2007/0019968 | A1 | 1/2007 | Hashimoto | |
| 2007/0047954 | A1* | 3/2007 | Mamyshev | G02F 1/0123 398/33 |
| 2007/0133918 | A1 | 6/2007 | Cho | |
| 2007/0212075 | A1 | 9/2007 | Yin | |
| 2008/0094123 | A1* | 4/2008 | Koh | G02F 1/0123 327/513 |
| 2009/0244685 | A1 | 10/2009 | Hoshida | |
| 2012/0033964 | A1* | 2/2012 | Mamyshev | G02F 1/0123 398/25 |
| 2012/0251104 | A1* | 10/2012 | Oberland | G02F 1/0123 398/38 |
| 2013/0121631 | A1 | 5/2013 | Yu | |
| 2014/0153077 | A1 | 6/2014 | Kawakami | |
| 2016/0036533 | A1 | 2/2016 | Nakashima | |
| 2016/0282699 | A1 | 9/2016 | Gottwald | |

OTHER PUBLICATIONS

Snoddy et al., Stabilization of electro-optic modulator bias voltage drift using a lock-in amplifier and a proportional-integral-derivative controller in a distributed Brillouin sensor system, Applied Optics, V. 46, N. 9, 2007.*

Tao Gui, Cai Li, Qi Yang, Xiao Xiao, Linghen Meng, Chao Li, Xingwen Yi, Chao Jin, and Zhaohui Li, "Auto bias control technique for optical OFDM transmitter with bias dithering," Opt. Express 21, 5833-5841 (2013).*

Xiaolei Li, Lei Deng, Xiaoman Chen, Mengfan Cheng, Songnian Fu, Ming Tang, and Deming Liu, "Modulation-format-free and automatic bias control for optical IQ modulators based on dither-correlation detection," Opt. Express 25, 9333-9345 (2017).*

Xiaoqi Zhu, Zhennan Zheng, Cheng Zhang, Lixin Zhu, Zhenning Tao, and Zhangyuan Chen, "Coherent Detection-Based Automatic Bias Control of Mach-Zehnder Modulators for Various Modulation Formats," J. Lightwave Technol. 32, 2502-2509 (2014).*

Kawakami et al., Auto bias control technique for optical 16-QAM transmitter with asymmetric bias dithering, Optics Express, V. 19, N. 26. (Year: 2011).*

H. Kawakami, et al.; "Auto Bias Control Technique Based on Asymmetric Bias Dithering for Optical QPSK Modulation"; IEEE J. Lightwave Tech., vol. 30, No. 7, pp. 962-968; Apr. 1, 2012 (7 pages).

Y. Yang, et al.; "A robust and dither-free technique for controlling driver signal amplitude for stable and arbitrary optical phase modulation"; Optics Express, vol. 19, No. 27, pp. 26353-26358; Dec. 19, 2011 (6 pages).

P. S. Cho, et al.; "Closed-Loop Bias Control of Optical Quadrature Modulator"; IEEE Photonics Tech. Ltrs., vol. 18, No. 21, pp. 2209-2211; Nov. 1, 2006 (3 pages).

P. Dong, et al.; "Experimental demonstration of microring quadrature phase-shift keying modulators"; Optics Ltrs., vol. 37, No. 7, pp. 1178-1180; Apr. 1, 2012 (3 pages).

* cited by examiner

BIAS CONTROL OF OPTICAL MODULATORS

FIELD OF THE INVENTION

The invention generally relates to photonic integrated circuits, and more particularly relates to an apparatus and method for an automated bias monitoring and control of an optical modulator.

BACKGROUND OF THE INVENTION

Optical waveguide modulators used in high-speed optical communications, such as those based on waveguide Mach-Zehnder (MZ) interferometric structures, may require active control of their operating conditions, and in particular of their bias voltage that sets the relative phase of interfering light waves in the modulator in the absence of the modulation signal. The waveguides of the modulator are typically formed in an electro-optic material, for example a suitable semiconductor or $LiNbO_3$, where optical properties of the waveguide may be controlled by applying a voltage. Such a waveguide modulator may be a part of an optical integrated circuit (PIC) implemented in an opto-electronic chip.

Very high speed optical systems may benefit from Quadrature Amplitude Modulation (QAM), which may be realized using a quadrature modulator (QM) that may be implemented using nested MZ interferometric structures. Such structures typically require controlling several bias voltages. For example, a QAM optical signal may be generated by splitting light from a suitable light source between two MZ modulators (MZM) driven by an in-phase (I) and a quadrature (Q) components of an electrical QAM signal carrying data, and then combining the resulting I and Q modulated light signals in quadrature, i.e. with a 90°, or $\pi/2$ radians (rad), relative phase shift $\phi_{IQ}$. For example the two MZMs of such QM may each be modulated by a BPSK (binary phase shift keying) signal while being biased at their respective null transmission points for push-pull modulation. When their outputs are added together in quadrature, i.e. with the relative phase shift $\phi_{IQ}=\pi/2$, a QPSK signal (Quaternary phase shift keying) results.

Various schemes for controlling bias set points of an optical IQ modulator have been disclosed. However, many of these schemes require high-bandwidth processing of the control signal which may be difficult or expensive to implement in practice. To ease constraints on the required electronics and improve the accuracy of the control system, bias control systems that use low-speed dither signals have been suggested. However, many of such systems require the detection of the dither frequency and integer multiples of it, which necessitates having a spectrally very clean, harmonic free dithering signal and corresponding dither detection system in order to avoid parasitic offsets. Furthermore, bias control schemes that rely on low-frequency dither signals usually have to vary the modulator bias in both directions to determine the correct direction to the optimum bias setting, which may add noise to the modulator.

Accordingly, it may be understood that there may be significant problems and shortcomings associated with current solutions and technologies for controlling a bias point of an optical waveguide modulator suitable for use in high-speed optical systems.

SUMMARY OF THE INVENTION

Accordingly, one aspect of the present disclosure relates to a method for operating an optical modulator circuit (OMC) comprising an input optical port for receiving input light, an output optical port configured to provide output modulator light and tapped light, and one or more bias electrodes configured for controlling a modulator set point. The method may comprise: a) providing light into the input port of the optical modulator circuit; b) providing one or more bias control signals to the one or more bias electrodes, the one or more bias control signals comprising at least one DC bias signal and a first dither signal; c) detecting, in the tapped light, a signature of the first dither signal using a phase-sensitive dither detection circuit configured to output at least one feedback signal that is responsive to a phase of said signature, the phase-sensitive dither detection circuit comprising a photodetector (PD) disposed to receive tapped light; d) providing slope information that is indicative of a direction of change of the at least one feedback signal relative to a change in the at least one DC bias signal; and e) adjusting the at least one DC bias signal in a direction determined using the slope information.

The method may further include, with the optical modulating circuit in operation, f) measuring the at least one feedback signal from the phase-sensitive detection circuit, and g) adjusting the at least one DC bias signal in a direction determined using the slope information saved in (e) and a sign of the at least one feedback signal measured in (f).

According to an aspect of the present disclosure, the method may include obtaining the slope information using the steps of: d1) recording the at least one feedback signal for two or more values of the at least one DC bias signal in a vicinity of a target set point thereof to collect bias scan data; d2) processing the bias scan data to determine the slope information.

In accordance with one aspect of the disclosure, the method may be applied to the OMC that comprises a quadrature modulator configured to combine two modulated optical signals in quadrature, the quadrature modulator comprising a first optical phase shifter electrically coupled to the bias control port for varying an optical phase shift between the two modulated optical signals for setting the modulator bias.

In one implementation of the method, wherein the phase sensitive dither detection circuit comprises a lock-in detector configured to receive an electrical PD signal from the PD, step (c) may comprise using the lock-in detector to detect the oscillation at the first dither frequency f1 or a frequency related thereto, and to obtain therefrom the at least one feedback signal comprising a first DC lock-in signal that is responsive to an amplitude and phase of the detected oscillation; step (d1) may comprise recording values of the first DC lock-in signal for the two or more values of the first DC bias signal; step (d2) may comprise determining, based on the values recorded in (d1), at least a sign of a slope of the first DC lock-in signal versus the first DC bias signal, wherein the slope information comprises the sign of the slope; step (f) may comprise measuring the first DC lock-in signal, and step (g) may comprise determining the direction of adjusting the first DC bias signal based on at least in part on a sign of the first DC lock-in signal measured in (g) and the sign of the slope.

An aspect of the disclosure provides a method for controlling a bias of a quadrature optical modulator circuit comprising a first optical modulator comprising a first bias electrode and a second optical modulator comprising a second bias electrode, wherein the first and second optical modulators are connected in parallel between the input optical port and the output optical port so as to form an outer Mach-Zehnder interferometer (MZI) structure comprising a third bias electrode. The method may comprise: providing first, second, and third DC bias signal to the first, second, and third electrodes, respectively; providing, to the first electrode, the first dither signal comprising a first dither tone at a first dither frequency $f_1$; providing, to the second electrode, a second dither tone at a second dither frequency $f_2$; detecting, in light tapped from an output of the outer MZI, an oscillation at a sum dither frequency $(f_1+f_2)$, to obtain at least one feedback signal that is responsive to an amplitude and a phase of said oscillation; varying the third DC bias signal in a vicinity of a target set point thereof; extracting, and saving in computer readable memory, slope information that is indicative of a direction of change of the at least one feedback signal relative to a change in the third DC bias signal; and adjusting the third DC bias signal in a direction determined using the slope information. The phase-sensitive dither detection circuit may comprise a lock-in detector connected to the PD.

One aspect of the present disclosure provides an optical modulator device comprising: a substrate; an optical modulator circuit formed in or upon the substrate and comprising: an input optical port for receiving input light; an output optical port configured to provide output modulator light and tapped light; one or more bias electrodes configured to control a modulator set point; and, a bias control circuit electrically coupled to the one or more bias electrodes. The bias control circuit comprises a controller configured to provide one or more bias control signals to the one or more bias electrodes, the one or more bias control signals comprising at least one DC bias signal and a first dither signal; and, a phase-sensitive dither detection circuit comprising a photodetector (PD) disposed to receive the tapped light, the phase-sensitive dither detection circuit configured to detect in the tapped light a signature of the first dither signal and to communicate to the controller at least one feedback signal responsive to a phase of said signature. The controller may comprise memory configured to store slope information that is indicative of a direction of change of the at least one feedback signal relative to a change in the at least one DC bias signal. The controller may further be configured to read the slope information from the memory and to adjust the at least one DC bias signal in a direction determined using the slope information. The optical modulator circuit may comprise an optical waveguide interferometer structure comprising one or more waveguide optical phase modulators.

In accordance with an aspect of the present disclosure, the optical modulating circuit may comprise a first optical modulator including a first bias electrode and a second optical modulator including a second bias electrode, with the input optical port comprising an optical splitter, the output optical port comprising an optical combiner, the optical combiner comprising a main output waveguide for transmitting the output modulator light, and with the first and second optical modulators connected in parallel between the optical splitter and the optical combiner so as to form an outer Mach-Zehnder interferometer (MZI) structure comprising a third bias electrode. The controller may be configured to provide a first bias control signal comprising the first dither signal to the first bias electrode, wherein the first dither signal comprises a first dither tone at a first dither frequency $f_1$, to provide a second bias control signal comprising a second dither signal to the second bias electrode, the second dither signal comprising a second dither tone at a second dither frequency $f_2$ that is greater than $f_1$ and differs from any harmonic of $f_1$; and to provide a third DC bias signal to the third bias electrode. The phase-sensitive dither detection circuit may comprise a lock-in detector connected to the PD and configured to detect, in an electrical PD signal received from the PD, a dither product signal at a sum frequency $f_{sum}=(f_1+f_2)$ and to obtain the feedback signal that is responsive to a phase of said dither product signal. The memory may store slope information that is indicative of a direction of change of the feedback signal relative to a change in the third DC bias signal. The controller may further be configured to read the slope information from the memory and to adjust the third DC bias signal in a direction determined using the slope information and the third feedback signal.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION OF THE INVENTION

Figure 1:
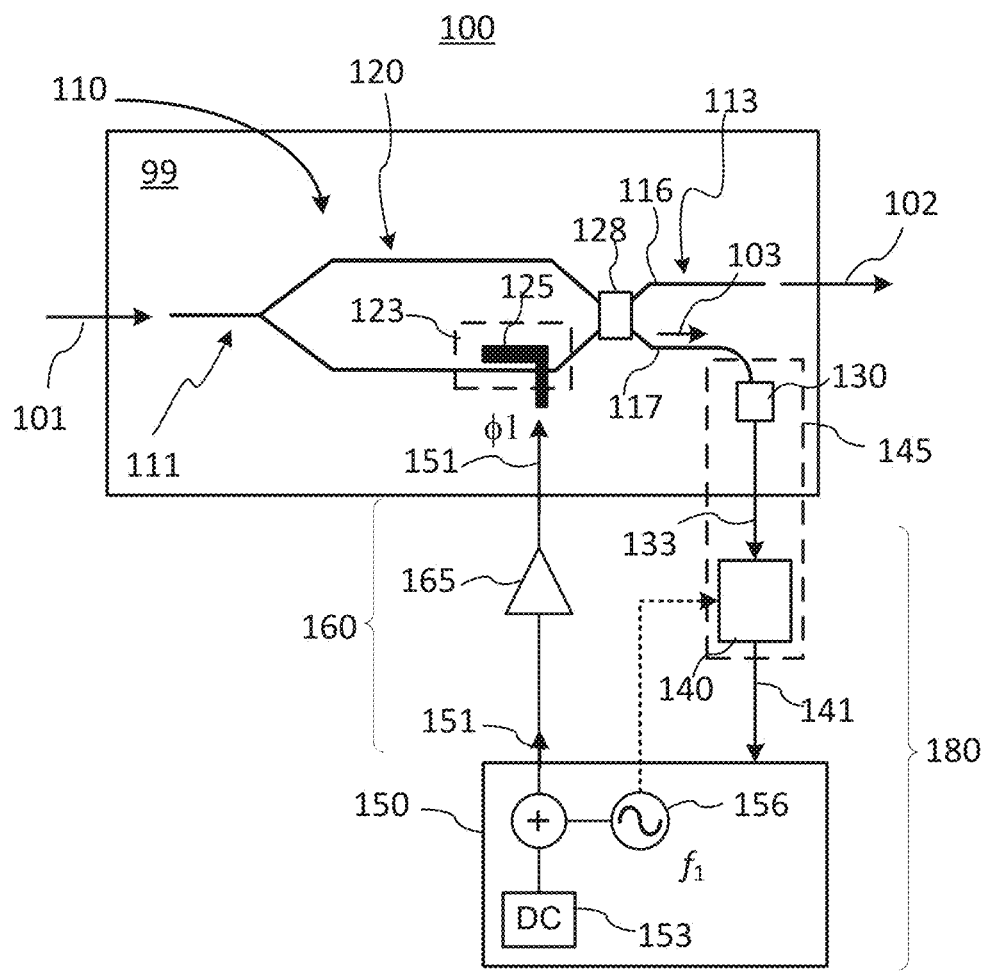
FIG. 1 is a schematic diagram of an optical Mach-Zehnder modulator with an optoelectronic bias control circuit incorporating a phase-sensitive dither detection circuit.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
CMOS Complementary Metal-Oxide-Semiconductor
GaAs Gallium Arsenide
InP Indium Phosphide
$LiNbO_3$ Lithium Niobate
PIC Photonic Integrated Circuits
SOI Silicon on Insulator
PSK Phase Shift Keying
BPSK Binary Phase Shift Keying
QAM Quadrature Amplitude Modulation
QPSK Quaternary Phase Shift Keying
RF Radio Frequency
DC Direct Current
AC Alternate Current Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by an optical device such as a polarizer or a waveguide, is to be understood as referring to an action performed by the optical device itself or by a component thereof rather than by an external agent. Notation $V\pi$ refers to a bias voltage of a Mach-Zehnder modulator (MZM) that corresponds to a change in a relative phase delay between arms of the MZM by $\pi$ rad, or 180 degrees, which corresponds to a change from a minimum to a next maximum in the MZM transmission.

One aspect of the present disclosure relates to an optical waveguide modulator which must be suitably biased, or kept at a desired set point of its electro-optic transfer function, to have a desired modulation characteristic. An electrical signal that controls the modulator bias or set-point may be referred to herein as the bias control signal, or simply as the bias signal, and may be typically but not exclusively in the form of a bias voltage, which may be denoted Vb. It will be appreciated that main aspects of the method of the current disclosure apply to both voltage-controlled and current-controlled modulators. In operation an optical modulator may experience changes in some of its properties, for example due to changes in its temperature or due to internal modulator processes such as aging or impurity drift, which may cause a target value of the bias voltage that is required to maintain the desired modulator set point to drift, resulting in a deterioration of one or more aspects of the modulator performance, and therefore necessitating a means to monitor that drift and to adjust the bias voltage accordingly. One way to accomplish that is to monitor an output optical signal from the modulator to detect the drift, and to adjust the bias control signal or signals accordingly to compensate for those changes.

With reference to FIG. 1, there is schematically illustrated an example optical modulator device 100 which is configured to operate with an automatic bias control. It includes an optical modulator circuit (OMC) 110 with an input optical port 111, an output optical port 113, and a waveguide interferometric structure forming an optical modulator 120 connected between them. The optical modulator 120, which may also be referred to herein as the first optical modulator, includes a bias electrode 125 configured to implement an optical phase tuner 123, which is controlled by an electrical bias circuit 180. The optical modulator 120 also typically includes a signal electrode (not shown) that provides an electrical modulating signal to the modulator 120 for modulating an optical phase of the input light 101 as it propagates in one or more waveguides forming the waveguide interferometric structure of the OMC.

In operation, the OMC 110 receives input light 101 in the input port 111 and transmits output modulator light 102 from the output port 113. The output modulator light 102, which may also be referred to as the main output light 102 or simply as the output light 102, may carry useful data and be directed along a data path of an optical communication system to an optical receiver at another end of an optical communication link. The output port 113 may further be configured to output tapped light 103, and may include, or be in the form of, an optical combiner 128. In one embodiment the optical combiner 128 may be in the form of a 2×2 optical coupler, such as for example a 2×2 multi-mode interference (MMI) coupler, with a main output waveguide 116 and an auxiliary or tap output waveguide 117. In another embodiment the tapped light 103 may be obtained by tapping off a small fraction of the main output light 103, for example using an optical tap coupler following the output optical combiner of the MZM, in a manner illustrated in FIG. 3 where an optical tap coupler 310 follows an optical combiner 315. Some embodiments may include other optical components disposed in the path of the output light 102 prior to the optical coupler tapping off the tapped light 103. The OMC 110 may conveniently be embodied using optical waveguides formed in or upon a support substrate 99 of an electro-optic or semiconductor material.

The bias electrode 125, which may also be referred to herein as the first bias electrode, is configured to control an optical phase delay $\phi_1$ in the modulator. As illustrated, the optical modulator 120 is a Mach-Zehnder modulator (MZM), and the optical phase delay $\phi_1$, which may also be referred to as the modulator phase shift, is a relative optical phase delay experiencing by light portions propagating in the two arms of the MZM. It is controlled by an electrical bias signal 151 that may be provided to the bias electrode 125 from a driver 160, typically but not exclusively in the form of a bias voltage Vb. In order to ensure proper operation of the MZM 120, the phase shift $\phi_1$ should be set to a specific target set-point value $\phi_1^o$. In example embodiments described hereinbelow, the target set-point value $\phi_1^o$ of the MZM phase shift $\phi_1$ corresponds to a minimum of the MZM transmission and is equal substantially to $\pi$ radian (rad), or 180 degrees, in which case optical signals from both arms of the MZM are added in counter-phase at the output of the MZM 120. However, the target value of the optical phase shift $\phi_1$ may differ in other embodiments, for example may correspond to a maximum in the MZM transmission, and all such values are within the scope of the present disclosure. By tuning the bias control signal 151, the value of the phase shift $\phi_1$ may be adjusted in operation in response to a drift in modulator properties, so as to maintain the modulator 120 at the desired set point wherein $\phi_1=\phi_1^0$.

It will be appreciated that the bias electrode 125 may be configured to control the optical phase delay $\phi_1$ using different physical mechanisms, including but not limited to an electro-optic and thermo-optic effects. For example in one embodiment the bias electrode 125 may be disposed over or adjacent to a waveguide arm of the MZM that is formed in an electro-optic material so as to induce in the waveguide an electrical field. In another embodiment it may be in the form of, or be electrically connected to, a resistive element disposed close to, or over, the waveguide to control its index of refraction by heating as known in the art. Accordingly, in FIG. 1 the shape and positioning of the electrode 125 is for illustration purposes only, and may differ from implementation to implementation.

The bias control signal 151 may be dynamically controlled using a bias feedback loop that includes a monitoring photodetector (PD) 130 and the bias control circuit (BCC) 180. The PD 130 may be optically coupled to the output port 113 to receive the tapped light 103 and to obtain an electrical PD signal 133 that may be indicative of the modulator set point. In some embodiments, both the modulator 120 and the PD 130 may be supported by the same substrate or wafer 99. By way of example, the substrate 99 may be a silicon-on-insulator (SOI) substrate and the PD 130 may be a p/n junction photo diode formed in the SOI substrate 99. In another embodiment, the substrate 99 may be a substrate or wafer of another suitable semiconductor material as known in the art, such as for example GaAs-based or InP-based, with the PD 130 formed therein. In another embodiment, the PD 130 may be mounted in a recess in the substrate 99. The PD 130 may also be a separate element optically coupled to the OMC 110, for example using suitable coupling optics and/or optical fiber.

The bias control circuit (BCC) 180 connects the monitoring PD 130 to the bias electrode 125 for controlling the modulator set-point by suitably tuning the bias control signal 151 in dependence on the PD signal 133. The BCC 180, which may also be referred to herein as electrical feedback circuit, includes a controller 150 that connects to the bias electrode 125 by means of a bias circuit 160. The controller 150 is configured to generate the bias control signal 151 S which may include a DC (direct current) bias signal $S_{DC}$ and a distinct dither signal $S_{dith}$, $S=S_{DC}+S_{dith}$. This may be accomplished, for example, by implementing within the controller 150 a dither signal source 156, a DC bias source 153, and a summing circuit. The electrical bias circuit 160, which may include a driver 165, provides the first bias control signal 151 to the first bias electrode 125, typically in the form of a bias voltage Vb. The DC bias signal $S_{DC}$ may also be referred to herein as the DC component of the bias control signal 151. The bias control signal S 151, the DC component thereof $S_{DC}$, the dither signals $S_{dith}$, and the bias voltage Vb may also be referred to herein as the first bias control signal S, the first DC bias signal, the first dither signal, and the first bias voltage Vb, respectively.

A phase-sensitive dither detector 140 connects to the PD 130, and is configured to detect in the PD signal 133 a signature of the first dither signal and to produce therefrom a first feedback signal 141 that is responsive to a phase of the dither signature, and to communicate the first feedback signal 141 to the controller 150. The absence of such signature, and hence a near-zero value of the first feedback signal 141, may indicate that the modulator 120 is biased at or near a minimum or a maximum of the modulator transmission characteristic as function of the bias voltage Vb. In operation the controller 150 may adjust the bias control signal 151 in dependence on the first feedback signal 141 generated by the phase-sensitive detector 140, as described hereinbelow more in detail.

In the example embodiments described hereinbelow the dither signal $S_{dith}$ is substantially an AC dither tone, which frequency may be referred to herein as the first dither frequency or simply as the dither frequency, and denoted $f_1$. The presence of an oscillation in the PD signal 133 at the dither frequency $f_1$ that rises above noise may indicate that the modulator is biased away from its target set point. The phase θ of this oscillation may depend on the electrical and optical properties of the OMC 110, the PD 130, and on electrical delays in the circuitry connecting the PD 130 and the phase-sensitive dither detector 140. The phase-sensitive dither detector 140 may be configured to produce the feedback signal 141 that is indicative at least of the detected dither phase θ, or preferably both the phase and the amplitude of the detected dither oscillation.

The dither detector 140 may be implemented, for example, as a lock-in detector or a lock-in amplifier, and may produce the feedback signal 141 by mixing or correlating the received PD signal 133 with a reference signal at the dither frequency $f_1$, and integrating the mixed signal over a number of periods $1/f_1$ of the dither oscillation being detected. The reference signal may be obtained for example from the dither source 156 of the controller 150.

In one embodiment the phase-sensitive dither detector 140 is a lock-in detector or lock-in amplifier that may produce the feedback signal 141 in the form of a lock-in signal that is proportional to an amplitude $U_{dith}$ of the dither oscillation in the PD signal 133, multiplied by a sine or a cosine of the phase θ thereof relative to the reference signal:

$$U_s = U_{dith} \cdot \sin(\theta), \quad (1)$$

or $$U_c = U_{dith} \cdot \cos(\theta), \quad (2)$$

The lock-in signals $U_s$ and $U_c$ given by equations (1) and (2) represent two quadrature components of the detected oscillation, and the lock-in detector 140 may be configured to output the feedback signal 141 as either one, or both, of these two lock-in signals $U_s$ and $U_c$.

The PD 130 and the lock-in detector 140 form a phase-sensitive dither detection circuit 145 that detects a signature of the dither signal in the tapped light 103 and converts it into a feedback signal 141 that is responsive to the phase of that signature. It will be appreciated that in other embodiments, the phase-sensitive dither detection circuit 145 may be implemented differently, for example partly in optics using an optical modulator disposed in the path of the tapped light 103 prior to the PD 130 and driven by the dither signal. It will also be appreciated that in other embodiments the dither signal $S_{dith}$ may be in a more complex form, for example in the form of a spread-spectrum signal or a signal generated using a pseudo-random bit sequence (PRBS), and the phase-sensitive dither detector 140 may be implemented in digital domain by correlating the PD signal to a local copy of the dither signal.

Referring again to FIG. 1, the BCC 180, including the phase-sensitive detector 140 and the controller 150, may be embodied using analog or digital circuitry, or a combination thereof. When embodied in digital circuitry, for example using suitable micro-processors, general purpose processors, programmable logic circuits such as FPGA, or an application specific integrated circuit (ASIC), the BCC 180 may include one or more analog-to-digital converters (ADC) and one or more digital-to-analog converters (DAC), which are not shown in the figure. For example, in one embodiment the phase-sensitive detector 140 may be a lock-in detector embodied using analogue circuitry, with the controller 150 embodied using a suitable digital processor, with an ADC (not shown) in the path of the detected signal 141 and a DAC (not shown) in the path of the bias control signal 151. In embodiments wherein the OMC 110 is implemented in a semiconductor chip, the BCC 180 may also be implemented fully or in part in the same semiconductor chip, or may be implemented separately therefrom. In some embodiments, the BCC 180 may be embodied as a separate module that may include one or more dedicated or shared hardware processors or programmable logic circuits. Furthermore, although not shown in FIG. 1, the OMC 110 may include optical elements other than the MZM 120, including other optical modulators.

Figure 2A:
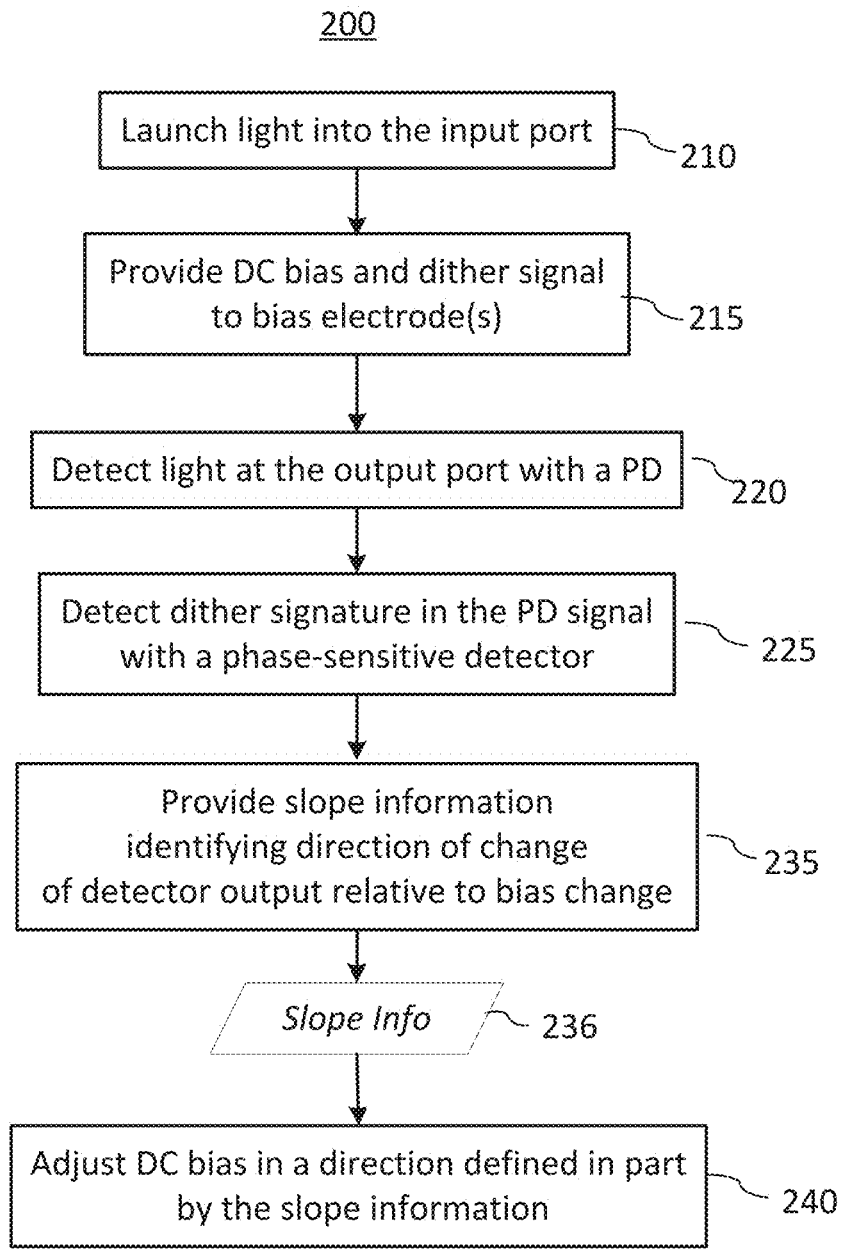
FIG. 2A is a flowchart of a method for controlling the modulator bias.

Referring now also to FIG. 2A, in operation the modulator device 100 may implement a process 200, which represents an example embodiment of a method for controlling a bias or set-point of an OMC in accordance with the present disclosure. As illustrated in the flowchart, the process or method 200 may start with the optical modulator circuit receiving input light into its input optical port, as indicated at 210; referring to the OMC 110, it may include providing the input light 102 into the input port 111. At step 215, one or more bias control signals that may include at least one DC bias signal and at least a first dither signal are provided to one or more bias electrodes of the OMC; referring to the OMC 110, it may include providing to the first bias electrode 125 the first bias control signal 151 that includes the first DC bias signal and the first dither signal. Next, a signature of the first dither signal is detected in the tapped light 103 using a phase-sensitive dither detection circuit configured to output at least one feedback signal that is responsive to a phase of said signature. In the illustrated embodiment that may include step 220 wherein the tapped light 103 from the modulator 120 is detected by the PD 130, and step 225 wherein the phase-sensitive detector 140 detects in the received PD signal 133 a trace or signature of the first dither signal and obtains therefrom the feedback signal or signals 141, which is responsive to the phase of said trace or signature.

A single measurement of the feedback signal or signals from the output of the phase-sensitive dither detection circuit for a given DC bias signal may however be insufficient to determine in which direction the bias control signal needs to be adjusted to bring the modulator closer to its target set point. Therefore, the method 200 may include step 235 of providing information 236, which is referred herein as the slope information, and which is indicative of a direction of change of the feedback signal or signals relative to a change in the DC bias signal. The slope information 236 is then used in step or operation 240 to determine the direction of bias adjustment, for example during the device operation, and to adjust the DC component of the bias control signal in that direction.

Figure 2B:
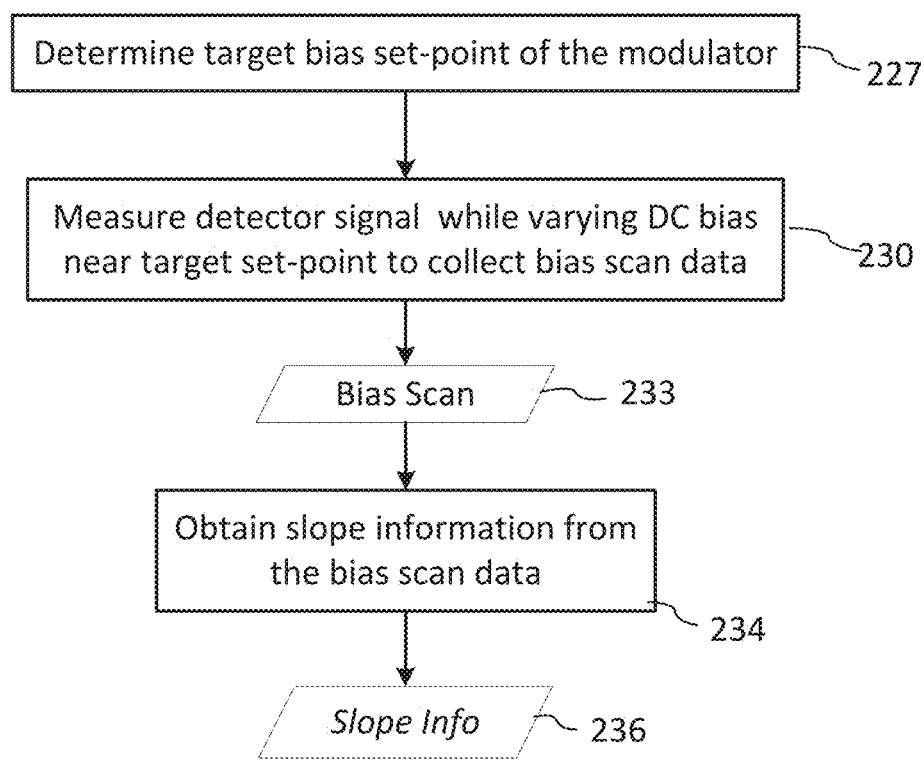
FIG. 2B is a flowchart of a process for determining slope information that may be used in the method of FIG. 2A.

Referring to FIG. 2B, the slope information 236 for the modulator device may be obtained, for example, using a process 201, which may start with steps 210-225 described hereinabove with reference to FIG. 2A, and then may proceed to step 227 of determining, at least approximately, the target bias set-point of the modulator circuit. At step 230 bias scan data 233 is collected by measuring the at least one feedback signal while varying the at least one DC bias signal in a vicinity of the target set-point thereof, and the collected bias scan data 233 is used in step 234 to obtain the slope information 236 that is indicative of a direction of change of the one or more feedback signals relative to a change in the at least one DC bias signal.

Several features of the method 200 will now be described in further detail with reference to FIGS. 1, 2A and 2B for an example embodiment wherein the dither signal generated in step or operation 215 is a dither tone of the dither frequency $f_1$, and step 225 includes using a lock-in detector to produce one or both of the sine and cosine lock-in signals Us and Uc as described hereinabove. The amplitudes of the dither tone at the bias electrode may be selected to be small enough so as not to interfere with the modulator operation, for example smaller than $V\pi/5$ or preferably smaller than $V\pi/10$, but still large enough to be detectable over noise in the PD signal 133 and to provide sufficient accuracy of the bias set-point tracking. The operation of the method 200 and process 201 at steps 230, 234, 235, and 240 may then be understood by noting that, when the bias control signal 151 varies in a vicinity of its target set point, which typically corresponds to a minimum in the modulator transmission as function of Vb, the amplitude $U_{dith}$ of the dither signal in the PD signal 133 depends on the DC component $S_{DC}$ of the bias control signal 151, or the corresponding bias voltage Vb, in an approximately linear fashion. Accordingly, the two quadrature feedback signals Us and Uc that may be obtained from the lock-in 140 may also be approximated with linear functions of the DC bias component, or the bias voltage Vb:

$$U_s \cong a_s \cdot (Vb - Vb^0), \quad (3)$$

$$U_c \cong a_c \cdot (Vb - Vb^0). \quad (4)$$

with the sign of the slope $a_{c,s}$ of the respective linear functions in the RHS of equations (3) and (3) defined by the cosine or sine of the dither phase delay $\theta$, in accordance with equations (1) and (2):

$$a_s = a \cdot \sin(\theta) \quad (5)$$

$$a_c = a \cdot \cos(\theta) \quad (6)$$

where a is a constant parameter.

Here $Vb^0$ stands for a bias voltage at which the dither tone in the PD signal 133 disappears, which for an ideal MZM may correspond to a minimum in the modulator transmission, and the coefficients $a_s$ and $a_c$ are defined as. The coefficients $a_s$ and $a_c$ define slopes of the functions Uc(Vb) and Us(Vb), and may be referred to herein as the slope coefficients, or simply as the slopes. The term "slope information" may refer to either of the slopes $a_s$ and $a_c$, to their signs, or to a parameter or parameters preserving information about their sign or signs.

It follows from equations (3)-(6) that if the sign of $\sin(\theta)$ and/or $\cos(\theta)$ is not known, a simple measurement of the lock-in signals Us and/or Uc may be insufficient to determine in which direction the bias voltage Vb should be adjusted to tune the modulator closer to the target set-point Vb0. We note however that the relative dither phase $\theta$ is defined by the signal delays in the optical and electrical circuits of the modulator device that are not expected to vary by more than a few nanoseconds. Hence for relatively small values of the dither frequency $f_1$ for example in a kHz or even a MHz range, $\theta$ may be expected to stay approximately constant during the device operation, even when the target set-point of the modulator bias drifts. Therefore once the sign of the slope coefficients $a_s$ and/or $a_c$ is/are determined, a single measurement of the lock-in signal or signals Us and/or Uc 141 may provide sufficient information to determine in which direction the bias voltage Vb should be adjusted to move closer to the target set-point.

Figure 6A:
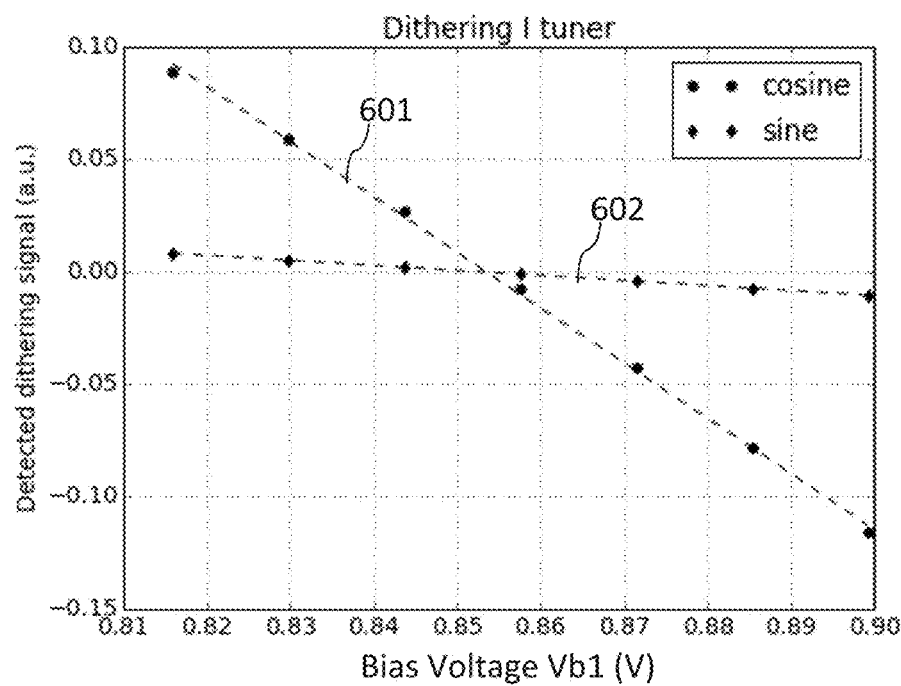
FIG. 6A is a graph illustrating bias scan data recorded from the output of the lock-in dither detector of the modulator apparatus of FIG. 3 for the first (I) of the two inner modulators near its target set-point.
Figure 6B:
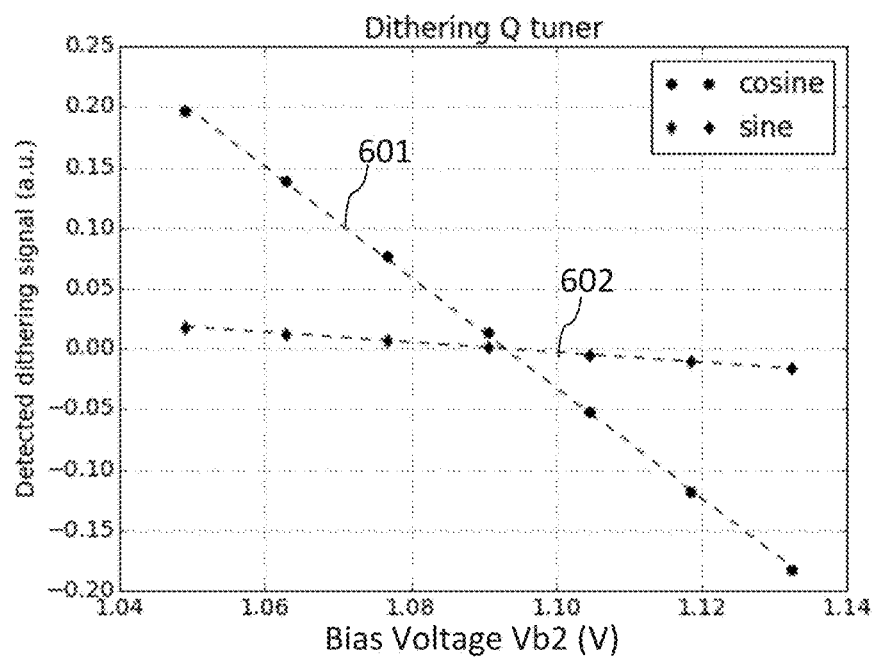
FIG. 6B is a graph illustrating bias scan data recorded from the output of the lock-in dither detector of the modulator apparatus of FIG. 3 for the second (Q) of the two inner modulators near its target set-point.

Accordingly, the step or operation 230 may include the controller 150 varying the DC component of the bias control signal S 151 and collecting the bias scan data 233 by recording values of the lock-in signal Us and/or Uc for several values of the DC component of the bias control signal 151 in the vicinity of its target set point, or equivalently for several values of the bias voltage Vb in the vicinity of Vb0. For example, in one embodiment step 230 may include varying the bias voltage across a voltage range of a width of about 0.1Vπ to 0.5Vπ about the target set-point bias Vb0, and recording the feedback signal or signals Uc and/or Uc for at least two, and preferably more values of the bias voltage in that range. This operation may provide the bias scan data in the form, for example, of two or more pairs of values (Us, Vb) that sample a function Uc(Vb). Using the collected bias scan data 233 the controller 150 may compute an estimate of the slope $a_s$ of the sine lock-in signal Us, for example as a slope of a linear fit to the recorded pairs of values. Similarly, a linear fit to the recorded samples of the function Uc(Vb) may provide an estimate of the slope $a_c$ of the cosine lock-in signal Uc. Examples of measured quadrature lock-in signals Us and Uc for several values of the bias voltage Vb, and the linear functions fitting the measured data, are illustrated in FIGS. 6A and 6B for two different MZMs.

Once one or both of the slopes $a_x$ and/or $a_c$ are determined, the slope information 236 may be saved in memory of the controller and used in step 240 to determine in which direction the DC component of the bias control signal 151 or its corresponding bias voltage Vb should be adjusted to bring the modulator 120 closer to the target set-point. In some embodiments, only the sign of one or both of the slopes may be recorded as the slope information 236.

By way of example, in one embodiment the bias scan data 233 collected at step 230 of process 201 may include values of one of the quadrature lock-in signals Us and Uc for several values of the bias voltage Vb in the vicinity of a minimum in the modulator transfer function, and step 235 may include using the recorded values to determine that the corresponding lock-in signal increases with an increase in Vb, corresponding to a positive sign of the slope $a_s$ or $a_c$. The DC bias signal is then adjusted at step 240 of method 200 towards a lower Vb if a current value of the same one of the quadrature lock-in signals Us and Uc is positive, or the DC bias signal is adjusted to increase the Vb if the current measurement of the corresponding lock-in signal by the controller yielded a negative value.

In some embodiments step 230 of process 201 may include recording values of both quadrature lock-in signals Us and Uc for a plurality of bias values, with both slopes $a_c$ and $a_s$ computed and recorded in memory at step 235. The direction of the bias adjustment at step 240 may then be determined taking into account recorded values of both these slopes, or at least the signs thereof, and current measured values of the respective lock-in signals Us and Uc. Taking into account measured values of both of the quadrature lock-in signals Uc and Us may provide a better tracking accuracy in the presence of noise, in particular when one of them is small. For example, in one embodiment step 240 of method 200 may include computing an error direction parameter 'eDir' as a sign function of a sum of the slopes $a_s$ and $a_c$ weighted with the corresponding current measured values of the lock-in signals Uc and Us:

$$eDir = sign(a_c \cdot U_c + a_s \cdot U_s) \quad (7)$$

where the function 'sign(Z)' denotes the sign of Z and may be equal to +1 (plus 1) when Z is positive, and to −1 (minus 1) when Z is negative. The negative error direction parameter eDir indicates that the bias voltage is smaller than its target value, and the controller may then increase the bias voltage by a small increment. A positive error direction parameter eDir would indicate that the bias voltage is greater than its target value, which may lead to the controller 150 decreasing the bias voltage by a small increment.

By way of example, the controller 150 may determine that the values of the sine and cosine lock-in signals Us and Uc recorded in step 230 of process 201 fit linear functions of the bias voltage Vb with the slope parameters $a_s=1$ and $a_c=-2$. Next, a measurement of the dither trace in the PD signal at step 225 of method 200 using the same bias control circuit yielded lock-in signal values Us=−0.045 and Uc=+0.11 when the modulator was operated with a bias voltage Vb=1.45V. The controller 150 may then compute the error direction parameter eDir using equation (7), yielding eDir=sign[−0.045−0.22]=−1, indicating to the controller that the bias voltage Vb should be increased.

In various embodiments, once the direction of change of the bias voltage Vb is determined based on a current measurement of the lock-in signal or signals Us and/or Uc using the slope information 236, the bias voltage may be incrementally increased or decreased. The size of the bias voltage increment δVb may be set in advance, for example in a range of 0.01V to 0.05V, or a few percent of Vπ for the modulator, so as to ensure a smooth operation of the modulator without abrupt changes in its modulation characteristic. In some embodiments, the size of the bias voltage increment δVb may be dynamically determined in dependence on the detected values of the feedback signal Us and/or Uc, optionally in combination with the stored value of the respective slopes $a_c$ and/or $a_s$, using any suitable control algorithm. By way of example, in one embodiment the controller 150 may implement a PID control algorithm wherein the size of the bias voltage increment δVb is dynamically determined in dependence on last several detected values of the feedback signal Us and/or Uc 141. In some embodiments, several measurements of the feedback signal 141 may be collected and averaged at step 240 to determine the direction of the bias adjustment, and optionally the size of the bias increment.

Varying a DC bias signal to collect the bias scan data 233 may be disruptive to normal operation of the modulator device, and therefore in some embodiments step 230 of process 201 may be performed during the device calibration or when the modulator device is idle. Since the dither phase delay θ is not expected to vary significantly during operation of the modulator device, the slope information 236 that was derived and stored at step 234 based on the bias scan or scans performed at step 230, may be used at a later time during the device operation to determine the direction of the bias adjustment when dynamically tracking variations in the modulator set point, without repeating the bias varying step 230. The process of dynamic bias control may include repeatedly measuring one or both of the lock-in signals Us and Uc, for example at prescribed time intervals, and adjusting the DC bias after each measurement, or when deemed necessary, in a direction determined by the current measured value of the lock-in signal, or the sign thereof, and the stored slope parameter.

Referring again to FIG. 2A, the operation at step 230 may be facilitated if the target set-point for the modulator bias control signal 151, such as the modulator bias voltage Vb, is approximately known, preferably with an accuracy of a small fraction of the modulator Vπ. Accordingly, in one embodiment method 200 and process 201 may include the step 227 of coarsely determining the target bias set-point Vb0 prior to step 230. This may be accomplished, for example, by varying the DC bias voltage in a suitably broad range while recording the modulator transmission characteristic, for example by measuring the DC component of the PD current 133, and determining the point of minimum transmission. In one embodiment, this step 227 may be combined with step 230 wherein the output(s) of the lock-in detector is/are recorded for a plurality of bias voltages in the vicinity of the target set point, e.g., at and/or near the minimum in the modulator transmission characteristic.

Advantageously, the aforedescribed method 200 enables to determine, from a single measurement, the direction in which the controller should adjust the modulator bias to converge to the optimal bias set point. Choosing a small step size, and iteratively repeating the steps of dither signal measurement and bias adjustment enables the process to converge to the optimal bias point and to dynamically track the optimum bias when it drifts during the modulator operation. Advantageously, the method enables detecting small deviations of the bias voltage from the optimal bias set-point when the later drifts, as well as the direction of the deviation, and therefore can smoothly adjust the bias voltage to keep the modulator at, or suitably close to, the optimal bias point.

Figure 3:
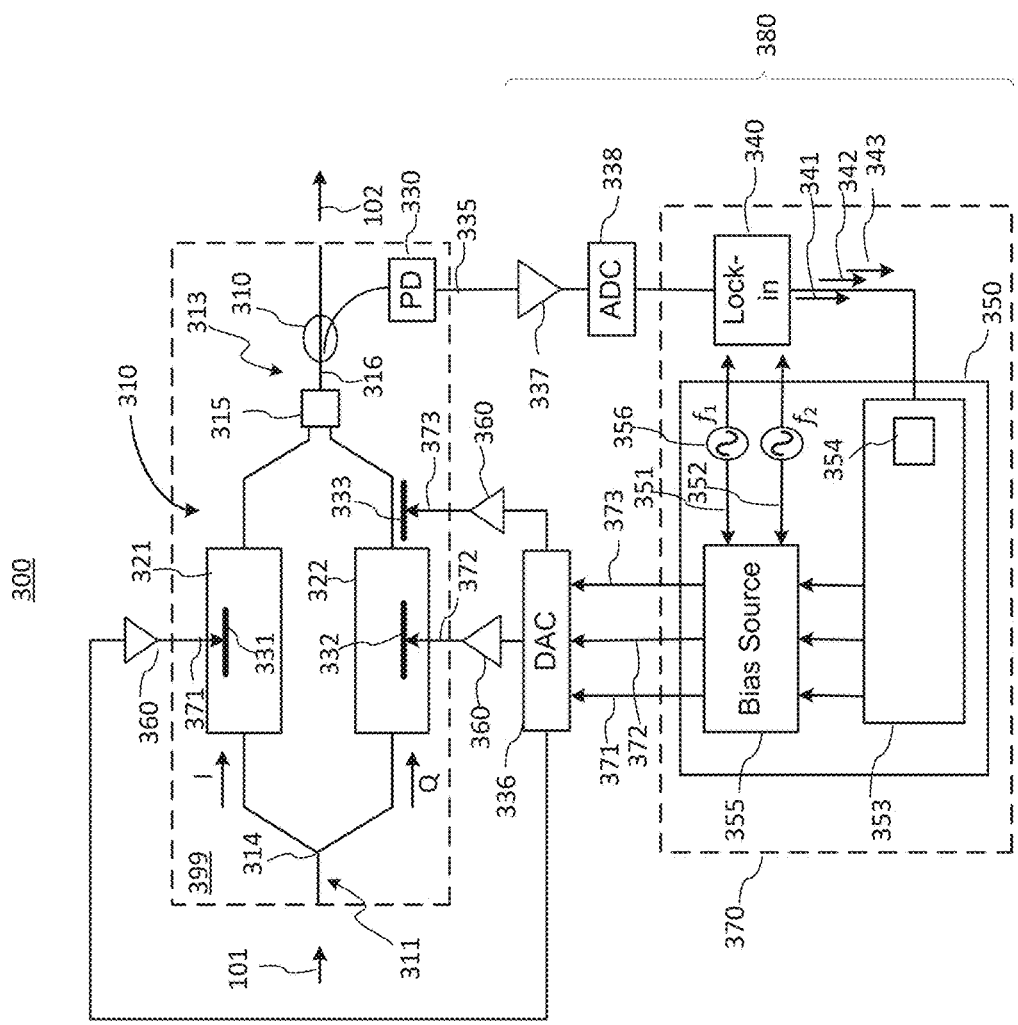
FIG. 3 is a schematic diagram of a modulator apparatus including an optical quadrature IQ modulator circuit and a multi-channel bias control circuit that incorporates a lock-in dither detector.

Referring now to FIG. 3, there is schematically illustrated an optical modulating circuit (OMC) 310 wherein first and second optical modulators 321, 322 are optically connected in parallel using an input optical splitter 314 and an output optical combiner 315, so as to form an outer Mach-Zehnder interferometer (MZI) connecting an input port 311 to an output port 313. The optical modulators 321, 322 may also be referred to herein as the first and second inner optical modulators, respectively. Similarly to the OMC 110 of FIG. 1, the OMC 310 may be implemented, for example, with optical waveguides formed in or upon a substrate 399 of a suitable electro-optic material, such as but not exclusively a SOI substrate or wafer. Each of the input optical splitter 314 and the output optical combiner 316 may be embodied using any waveguide strictures commonly known to provide the respective functionalities, such as, for example, with a directional waveguide coupler or with a 2×2 multi-mode interference (MMI) coupler. In operation, input light 101 that enters the OMC 310 from an input port 311 is first split by the optical splitter 314 in two light portions that pass through the respective optical modulators 321, 322 and are recombined by the optical combiner 315 to leave the OMC 310 by means of a main output waveguide 316 of the output optical port 313. A monitoring PD 330 is optically coupled to the OMC 310 to receive light tapped from the output of the optical combiner 315, for example using an optical tap coupler 310 disposed after the optical combiner 315. In embodiments wherein the output combiner 315 has two or more output ports, such as for example a 2×2 MMI coupler, the monitoring PD 330 may be coupled to a second, auxiliary, output port of the optical combiner (not shown in FIG. 3).

The optical modulators 321, 322 each include a bias electrode, schematically illustrated in FIG. 3 at 331 and 332, which is configured to implement an optical phase tuner for controlling a set point of the respective optical modulator by adjusting a relative optical phase delay in the modulator, for example as described hereinabove with reference to FIG. 1.

The bias electrode 331 of the first optical modulator 321 may be referred to herein as the first bias electrode 331, while the bias electrode 332 of the second optical modulator 322 may be referred to herein as the second bias electrode 332. In one embodiment each of the inner optical modulators 321, 322 may be implemented in the form of an MZM, such as the MZM 120 illustrated in FIG. 1.

In operation, the set point of the first optical modulator 321 is controlled by a first bias control signal 371, which originates from a controller 350 and may be provided to the first bias electrode 331 in the form of a first bias voltage Vb1. The set point of the second optical modulator 322 is controlled by a second bias control signal 372, which may also originate from the controller 350 and may be provided to the second bias electrode 332 in the form of a second bias voltage Vb2.

In one embodiment OMC 310 may be configured to implement a quadrature modulator (QM), which may also be referred to as an IQ modulator, in which the two light portions that pass through the modulators 321, 322 are converted by the modulators into two optical signals and are combined by the combiner 315 so that the output light 102 is quadrature-modulated. The two optical signals produced by the optical modulators 323, 324 are conventionally referred to as the I optical signal and the Q optical signal, where 'I' stands for "in-phase" and 'Q' stands for "quadrature." The outer MZI structure of the OCM 310 may include a third bias electrode 333 that is configured to implement an optical phase tuner to adjust, in response to a third bias control signal 373, a relative optical phase delay between the I and Q optical signals in the outer MZI, so that these signals are added together in the output combiner 315 with an IQ phase shift $\phi_{IQ}$ therebetween. In order to ensure proper operation of the OMC 310, for example as a QAM modulator, the IQ phase shift $\phi_{IQ}$ should be set to a desired target set-point value $\phi_{IQ}^0$. In example embodiments described hereinbelow, the desired target set-point value $\phi_{IQ}^0$ of the IQ phase shift $\phi_{IQ}$ is equal substantially to π/2 rad, so as to ensure that the I and Q optical signals in the QM 310 are added in quadrature at the output of the combiner 315; however, the particular desired value of the optical phase shift $\phi_{IQ}^0$ may differ in other embodiments, and all such values are within the scope of the present disclosure. The value of the IQ phase shift $\phi_{IQ}$ is controlled by the third bias control signal 373 which may be adjusted in operation by the controller 350 in response to a drift in modulator properties so as to maintain the desired set point $\phi_{IQ}=\phi_{IQ}^0$.

An electrical bias control circuit (BCC) 380 of the OMC 310 includes the controller 350 that connects to the bias electrodes 331-333 of the OMC 310 and generates the bias control signals 371-373. The bias control circuit 380 further includes a phase-sensitive dither detector 340 that receives a PD signal 335 from the PD 330 and provides its output signal or signals to the controller 350 as a feedback for tuning the bias settings of the OMC 310. The BCC 380 and the controller 350 may be a variation, or a multi-channel implementation, of the BCC 180 and the controller 150 described hereinabove with reference to FIGS. 1, 2A, and 2B, so that the description of possible embodiments, features, and functionalities of the BCC 180 and the controller 150 may apply mutatis mutandis to the BCC 380 and controller 350.

The controller 350 may be configured, for example programmed, to include one or more functional modules that implement one or more steps of a bias control method of the current disclosure. In the illustrated embodiment the controller 350 may be configured to implement a bias control module 353, a bias source module 355, and one or more dither generating modules 356. The bias source module 355 may be configured to generate the DC bias components of the bias control signals 371-373, and to vary them in responds to instructions from the bias control module 353. The bias source module 355 may also add one or more dither tones to one or more of the bias control signals 371, 372 destined to the bias electrodes of the first and second optical modulators 321, 322, respectively. The bias control module 353 may be configured to determine how to adjust one or more of the DC components of the bias control signals 371-373 in dependence on a signal or signals 341-343 received from the phase sensitive detector 340.

In the illustrated embodiment both the controller 350 and the phase-sensitive detector 340 are implemented with digital electronics, for example with a single dedicated or shared digital hardware processor 370, or with two or more shared or dedicated hardware processors. Accordingly, the bias control circuit 380 includes an ADC 338 that converts the electrical PD signal 335 into a digital signal, and a multi-channel DAC to convert the bias control signals 371, 372, 373 generated by the controller 370 from the digital to electrical domain. From the DAC 336, each of the bias control signals 371-373 may be provided to a respective bias electrode 331, 332, or 333 in the form of a bias voltage Vb1, Vb2, or Vb3 by means of a respective bias driver 360. The electrical circuit connecting the PD 330 to the lock-in detector 340 may include a trans-impedance amplifier (TIA) 337 preceding the ADC 338. It will be appreciated that all or some of the functional modules that are shown in FIG. 3 to be implemented digitally, such as for example the dither generators 356 and/or the lock-in detector 340, may also be implemented at least in part using analogue electronic circuits.

The controller 350 may be configured to generate the first bias control signal 371 $S_1$ having a first DC bias component $S_{DC1}$ that defines a bias set-point of the first optical modulator 321, the second bias control signal 372 $S_2$ having a second DC bias component $S_{DC1}$ that defines a bias set-point of the second optical modulator 322, and the third bias control signal 373 $S_3$ having a third DC bias component $S_{DC3}$ defining a bias set-point of the outer MZI 310. The DC components of the first, second, and third bias control signals 371, 372, and 373 may also be referred to herein as the first, second, and third DC bias signals, respectively. In operation each of these signals may be individually tuned by the controller 350 as needed to track changes in the target bias set-point of the first and second optical modulator and the target set-point of the outer MZI.

In one embodiment, the process of bias control for the OMC 310 may include an initial coarse-tuning stage and a fine-tuning stage. During the initial coarse-tuning stage each of the three DC bias signals $S_{DC1}$, $S_{DC2}$, and $S_{DC3}$ of the OMC 310 are brought suitably close to their target set points. At the fine-tuning stage the respective bias signals are further optimized and/or dynamically adjusted to track any drift in the target bias set points that may occur during the device operation.

The initial coarse-tuning stage may be performed using a variety of bias optimization algorithms. It may include, for example, launching input light 102 into the input port 311, and the controller 350 recoding the PD signal 335 while keeping two of the three DC bias signals $S_{DC1}$, $S_{DC2}$, and $S_{DC3}$ and scanning the remaining DC bias signal, so as to determine an optimal value thereof. The PD signal 335 may be provided to the controller 350 at this stage bypassing the lock-in detector 340 as an indication of the optical power from the modulator to record the transmission. This process may then be repeated iteratively varying each of the DC bias signals to coarsely determine the target set-point values of all three DC bias signals $S_{DC1}$, $S_{DC2}$, and $S_{DC3}$. In one embodiment, the fixed bias signals may be optimized for maximum transmission of the OMC during the scans.

By way of example, the controller 350 may first fix Vb2 and Vb3 at trial values thereof, and vary the first bias voltage Vb1 of the first modulator 321 to determine its interim optimal value. The controller 350 may than look for an interim optimal value for Vb2 by setting Vb1 to its found interim optimal value, and varying Vb2 while keeping Vb1 and Vb3 fixed. Finally, an interim optimal value for Vb3 may be found by keeping Vb1 and Vb2 to their respective interim optimal values, and varying Vb3. These steps may then be iteratively repeated to arrive at the initial coarse settings of each of the DC bias signals $S_{DC1}$, $S_{DC2}$, and $S_{DC3}$ and the corresponding bias voltages Vb1, Vb2, and Vb3.

Figure 4A:
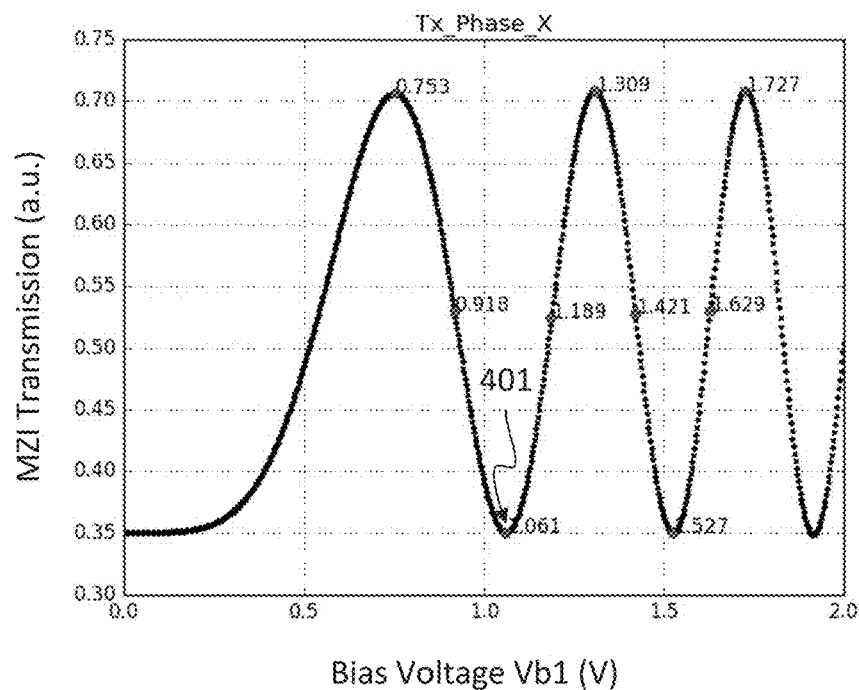
FIG. 4A is a graph illustrating optical transmission of the IQ modulator circuit of FIG. 3 as a function of a bias voltage Vb1 of a first of the two inner modulators.
Figure 4B:
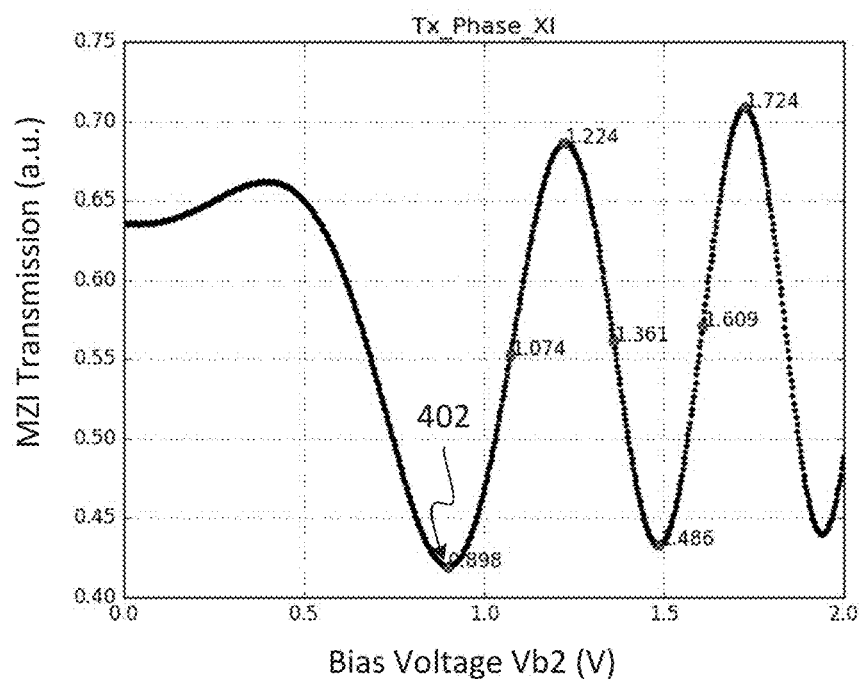
FIG. 4B is a graph illustrating optical transmission of the IQ modulator circuit of FIG. 3 as a function of a bias voltage Vb2 of a second of the two inner modulators.
Figure 4C:
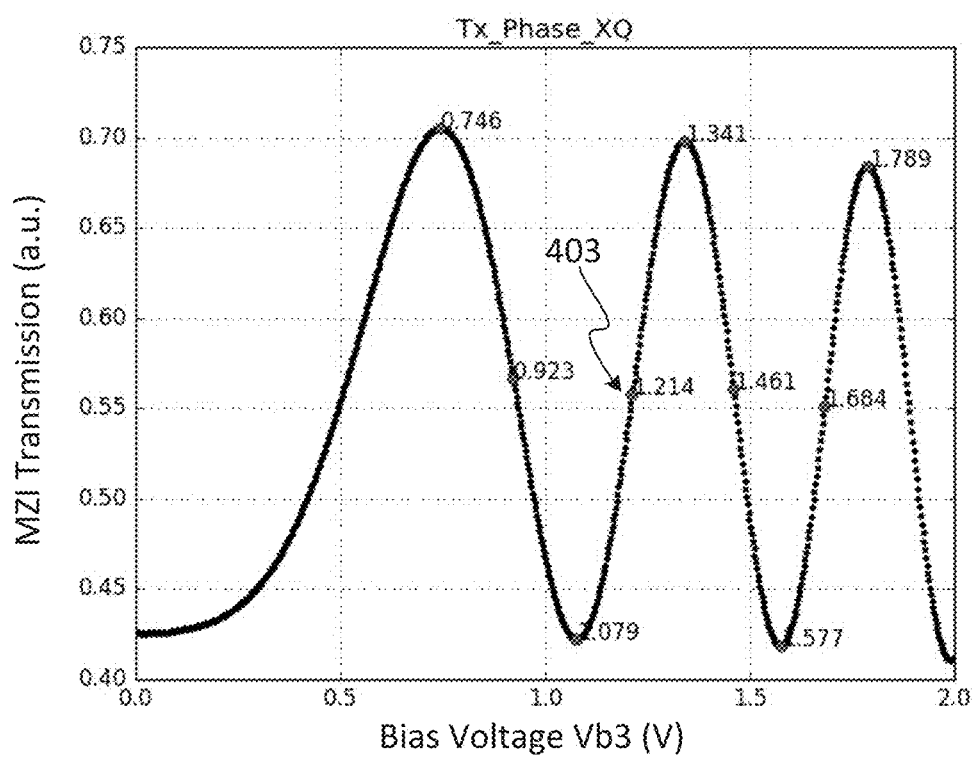
FIG. 4C is a graph illustrating optical transmission of the IQ modulator circuit of FIG. 3 as a function of a third bias voltage Vb3 controlling the IQ optical phase delay.
Figure 5:
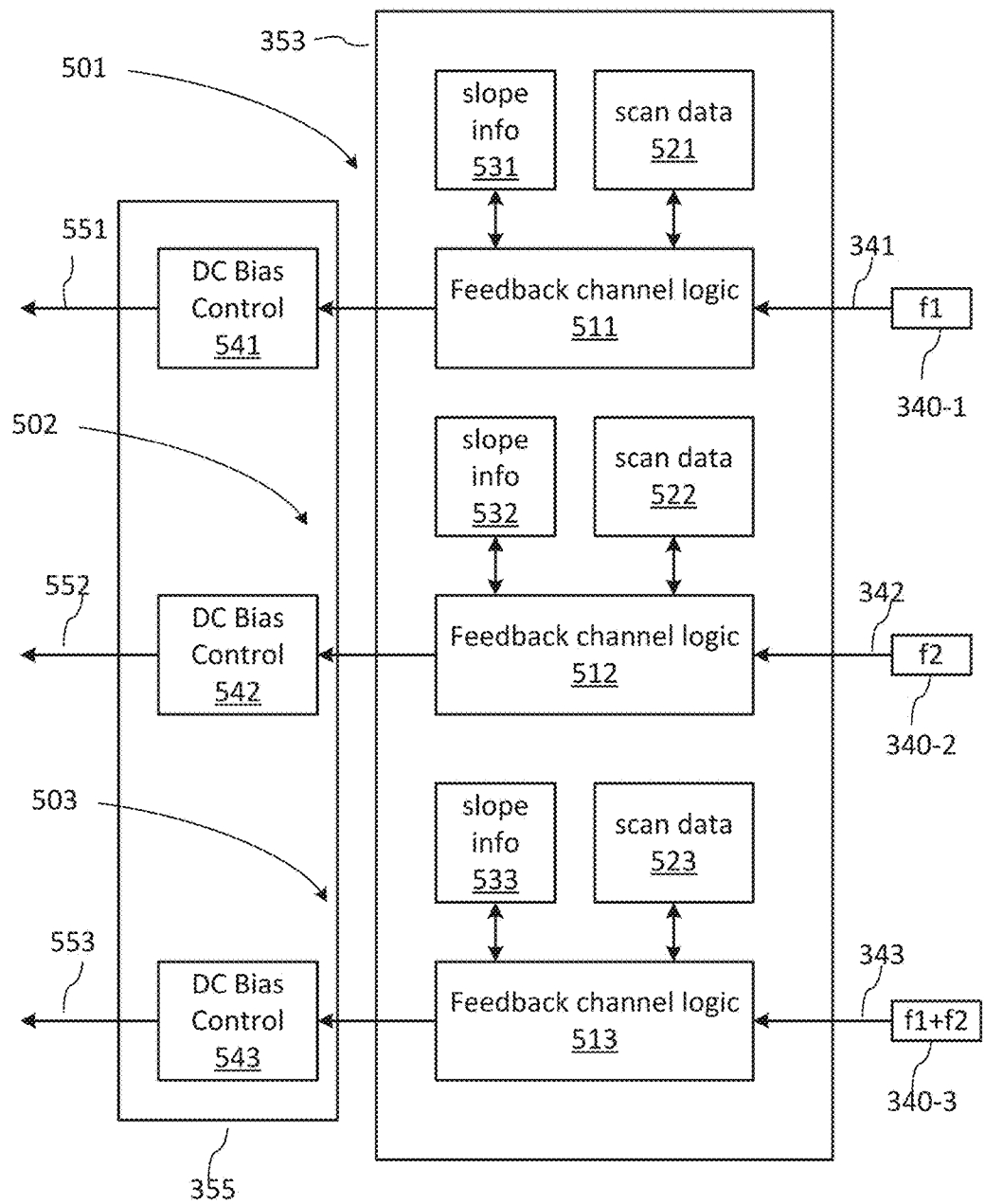
FIG. 5 is a functional block diagram of the controller of the modulator device of FIG. 3 configured to support three bias feedback channels.

After the process of the coarse tuning of the bias signals of the OMC 310 is completed, the transmission characteristic of the OMC 310 as a function of each of the three bias signals, P(Vb1, Vb2, Vb3), exhibits an oscillatory behavior, as illustrated in FIGS. 4A-4C for an example dual-polarization OMC embodiment illustrated in FIG. 5. Here, P( ) denotes the optical power at the output of the OMC as a function of a bias voltage or voltages. In order for the OMC 310 to operate as a QM modulator, the target bias setting for the first and second optical modulators 321, 322 may correspond to minima in their transmission characteristics, for example as indicated in FIGS. 4A and 4B at 401 and 402, while the target bias setting for the outer MZI may be mid-way between a minimum and a maximum in the respective transmission characteristic P(Vb3), i.e., at the point of its maximum slope, for example as indicated in FIG. 4C at 403. In an example embodiment of FIGS. 4A-4C, the target bias for the first inner modulator 321 may correspond to a target value of the first bias voltage Vb1=Vb10≅1.061 V, the target bias for the second inner modulator 322 may correspond to a target value of the second bias voltage Vb2≅Vb20≅0.898 V, while the target bias setting for the outer MZI may correspond to a target value Vb30 of the third bias voltage Vb3 of about 1.214 V.

Once the target settings of the bias control signals 371, 372, and 373 of the OMC 310 are coarsely identified, the bias control signals or voltages of the inner modulators 321 and 322 may be further optimized, and/or dynamically controlled to stay at their respective target set-points, substantially as described hereinabove with reference to method 200 and FIGS. 1 and 2A,B.

In one embodiment, the bias setting of the first and second modulators 321, 322 may be controlled by dithering their respective bias voltages and monitoring the PD signal 335 with the phase-sensitive detector 340 and implementing steps 225-240 of the method 200 in time-multiplexed manner, i.e. by configuring the controller 350 to tune the bias control signals 371-373 in different time slots. In this embodiment the same dither signal, for example a dither tone at the first dither frequency $f_1$, may be switched between the bias electrodes 331, 332 of the first and second modulators 321, 322, and tuning the DC component of the respective bias control signal 371 or 372 in dependence of the output of the detector 340 in accordance with steps 225-240 of method 200.

In example embodiments described hereinbelow, the BCC 380 may be configured to concurrently control all three bias settings of the OMC 310 by implementing three bias control channels, which may also be referred to as feedback channels, that may operate concurrently to separately and substantially independently control the first bias control signal 371, the second bias control signal 372, and the third bias control signal 373, each substantially as described hereinabove with reference to steps 225-240 of method 200.

In some embodiments, all three bias control channels may be implemented using only two distinct dither signals that are applied to the bias electrodes 331, 332 of the first and second optical modulators 321, 322. Accordingly in these embodiments the controller 350 may include two dither sources 356 configured to generate a first dither signal $S_{dith1}$ 351 and a second dither signal $S_{dith2}$ 352 that may be distinct from the first dither signal 351. These dither signals may be combined with the first and second DC bias signals $S_{DC1}$ and $S_{DC2}$, so that in operation the controller 350 may output the first bias control signal 371 that includes the first DC bias component $S_{DC1}$ and the first dither signal $S_{dith1}$ to dither the bias setting of the first optical modulator 321, and the second bias control signal 372 that includes the second DC bias component $S_{DC2}$ and the second dither signal $S_{dith2}$ to dither the bias setting of the second optical modulators 322, each generally as described hereinabove with reference to the optical modulator 120 of the OMC 110. The amplitudes of the two dither signals may be selected to be small enough so as not to interfere with the modulator operation, for example to be smaller than $V\pi/5$ or preferably smaller than $V\pi/10$ when applied to the respective first and second bias electrodes, but still large enough to be detectable over noise in the PD signal 335 and to provide sufficient accuracy of the bias set-point tracking.

The phase-sensitive detector 340 may be configured to separately detect traces of the first and second distinct dither signals 351, 352 in the electrical PD signal 335, and to convert the detected traces of the first dither signal 351 and the second dither signal 352 into the first and second feedback signals 341 and 342, respectively, each of which being sensitive to at least a phase of the respective detected dither trace, and preferably to both the phase and an amplitude of the respective detected dither trace.

By applying two distinct dither signals, for example two dither tones at to different dither frequencies, to the first and second bias electrodes 331 and 332, and separately detecting their signatures in the PD signal 335 using a multi-channel implementation of the phase-sensitive detector 340 to output a first feedback signal 341 that is responsive to a phase of a signature of the first dither signal and a second feedback signal 342 that is responsive to a phase of a signature of the second dither signal, the bias settings of the first and second optical modulators 321, 322 can in operation be each controlled substantially independently, by tuning the first bias control signals 371 in response to the first feedback signal 341 in a first bias control channel, and tuning the second bias control signals 372 in response to the second feedback signal 342 in a second bias control channel, each substantially as described hereinabove with reference to FIGS. 1 and 2 and method 200.

The third feedback channel for controlling the IQ phase shift $\phi_{IQ}$ via the third bias control signal 373 may be implemented by configuring the phase-sensitive detector 340 to detect a product $S_{12} \sim S_{dith1} \times S_{dith2}$ of the two dither signals applied to the electrodes of the first and second optical modulators in the monitored PD signal 355, and to output a third feedback signal 343 that is indicative of at least a phase thereof, and preferably to both the phase and the strength, or magnitude, of the dither product signature. The third feedback signal 343 may then be processed by the controller 350 in substantially the same manner as the first and second feedback signals 341, 342, and as described hereinabove with reference to method 200, and in particular to steps 230-240 of method 200 and process 201. Note that the strength of the dither signal product $S_{12}$ in the PD signal 355 may indicate a degree of non-linearity in the transmission characteristic of the outer MZI of the OMC 310; accordingly, controller 350 may use the third feedback signal 343 as an error signal in optimizing the bias setting of the outer MZI by adjusting the third bias control signal 373 and the third bias voltage Vb3 at the third bias electrode 333.

Referring to FIG. 5, there is schematically illustrated a functional block diagram of the controller 350 in one embodiment thereof. In the illustrated embodiment, the bias controller 353 may include a first feedback processing logic 511 configured to process the first feedback signal 341 received from a first channel 340-1 of the detector 340, a second feedback processing logic 512 configured to process the second feedback signal 342 received from a second channel 340-2 of the detector 340, and a third feedback processing logic 513 configured to process the second feedback signal 343 received from a third channel 340-3 of the detector 340. Each of the feedback processing logics 511, 521, and 523 is operatively coupled to a corresponding DC bias control module 541, 542, and 543 so as to control the first DC bias signal 551, the second DC bias signal 552, and the third DC bias control signal, thereby implementing three bias control channels 501, 502, and 503. Each of the feedback processing logics 511, 512, and 513 of the first, second, and third control channels 501-503 is operatively coupled to regions of controller memory configured to store respective bias scan data 521, 522, and 523 respectively, and to store corresponding slope information 531, 532, and 533 respectively.

In one embodiment the process of controlling the bias settings of the OMC 310 may include a) adding the first distinct dither signal $S_{dith1}$ to the first bias signal 371 $S_1$ and the second distinct dither signal $S_{dith2}$ to the second bias signal 372, and b) calibrating the modulator device 310 with respect to a dither phase delay in each feedback channel 501, 502, and 503, each generally as described hereinabove with reference to FIG. 2B.

The phase delay calibration process may include i) collecting first bias scan data 521 for the first inner optical modulators 321 by varying only the first DC bias signal and measuring the first feedback signal 341 so as to determine, and record in memory, first slope information 531 indicating the direction of change of the first feedback signal 341 relative to a change in the first DC bias signal $S_{DC1}$, and ii) collecting second bias scan 522 data for the second inner optical modulators 322 by varying only the second DC bias signal $S_{DC2}$ and measuring the second feedback signal 342 so as to determine, and record in memory, second slope information 532 indicating the direction of change of the second feedback signal 342 relative to a change in the second DC bias signal.

The first channel logic 511 of the controller 350 may be configured to use the first slope information 531 in the first feedback channel 501 to determine the direction in which the first DC bias signal $S_{DC1}$ 551 is to be adjusted in response to changes in the first feedback signal 341 during the device operation. The second channel logic 512 of the controller 350 may be configured to use the second slope information 532 in the second feedback channel 502 to determine the direction in which the second DC bias signal $S_{DC2}$ 552 is to be adjusted in response to changes in the second feedback signal 342. The respective first and second slope information 531, 532 may also be used by respective channel logics to adjust the first and second DC bias signals 551, 552, respectively, to fine-tune the bias settings of the first and second modulators 321, 322, for example during the modulator start-up.

In one embodiment, the phase delay calibration process may include using the third channel logic 513 for collecting the third bias scan data 523 for the IQ bias of the OMC 310 by varying only the third DC bias signal 553 that is applied to the third electrode 333, and measuring the third feedback signal 343 so as to determine, and record in memory, third slope information 533 indicating the direction of change of the third feedback signal 343 relative to a change in the third DC bias signal $S_{DC3}$ 553. The third channel logic 513 of the controller 350 may be configured to use the third slope information 533 in the third feedback channel 503 to determine the direction in which the third DC bias signal $S_{DC3}$ 553 is to be adjusted in response to changes in the third feedback signal 343 during the device operation. The third slope information 533 may also be used to adjust the third DC bias signal 553 to fine-tune the IQ bias setting of the outer MZI 310, for example during the modulator start-up.

Referring back to FIG. 3, in an example embodiment the first and second dither signals 351, 352 may be in the form of dither tones at two distinct frequencies $f_1$ and $f_2$, so that the first bias control signal 372 includes a first dither tone at the first dither frequency $f_1$, and the second bias control signal 372 includes a second dither tone at the second dither frequency $f_2$. The dither frequencies $f_1$ and $f_2$ may be selected to be relatively low, typically much smaller than the data rate of the modulator device 300; for example, both of these dither frequencies may lie in a kilohertz range, but are not limited thereto.

In one embodiment, the two dither frequencies $f_1$ and $f_2$ differ from each other, and neither of them is a harmonic of the other. In one embodiment, the first and second dither frequencies $f_1$ and $f_2$ may be selected so that the sum of the first and second dither tones is a periodic function, so that the phase-sensitive detector 340 could use an integration cycle that is equal to an integer number of periods of each of the two frequency tones $S_{dith1}$ and $S_{dith2}$ to avoid distortions. By way of example, a signal sampling frequency is 25 kHz, $f_1$=2.5 kHz, and $f_2$=3.125 kHz, $f_{sum}$ 5.625 kHz respectively. If the integration time of the lock-in detector is 40 samples, then the 2.5 kHz tone is sampled 4 cycles, the 3.125 kHz tone is sampled 5 cycles and the 5.625 kHz tone is sampled over 9 cycles. Hence, the three reference times may be aligned so that after each 40 samples they all reach 'zero', thereby avoiding integration errors.

The phase sensitive dither detector 340 may be implemented as a lock-in or homodyne detector configured to detect oscillations at least one of the first dither frequency f1, the second dither frequency f2, and a sum dither frequency $f_{sum}=(f_1+f_2)$ corresponding to a product of the two dither tones. In one embodiment the lock-in detector 340 may be a configured to concurrently detect and measure oscillations at all three of these frequencies.

In one embodiment the lock-in detector 340 may have a first detection channel configured to mix the received electrical PD signal 355 with a reference tone at the first dither frequency $f_1$ and to output, as the first feedback signal 341, at least one of two DC signals $Uc_1$ and $Us_1$ that represent quadrature components of a detected oscillation at the first dither frequency f1, and a second detection channel configured to mix the received electrical PD signal 355 with a second reference tone at the second dither frequency $f_2$ and to output, as the second feedback signal 342, at least one of two DC signals $Uc_2$ and $Us_2$ that represent quadrature components of a detected oscillation at the second dither frequency f2.

In one embodiment, the lock-in detector 340 may have a third detection channel configured to mix the received electrical PD signal 355 with a third reference tone at the sum dither frequency $f_{sum}=(f_1+f_2)$ and to output, as the third feedback signal 343, at least one of two DC signals $Uc_3$ and $Us_3$ that represent quadrature components of a detected oscillation at the sum dither frequency $f_{sum}$. The third reference tone at the sum frequency may be generated by the controller 350 or the lock-in detector 340 by a frequency summing circuit from the first and second dither tones 351, 352.

The DC signals $Uc_i$ and $Us_i$, i=1, 2, or 3, may satisfy equations (1) and (2) with $\theta=\theta_i$ representing a respective relative phase $\theta_i$ of the detected dither or dither product oscillation, and $U_{dith}=U_{dith1}$ being the amplitude of the respective detected oscillation.

Referring to both FIG. 3 and FIG. 5, in one embodiment, the bias control module 353 of the controller 350, or the first channel logic thereof 511, may be configured to collect the first scan data 521 by varying the DC component $S_{DC1}$ 551 of the first bias control signal 371 in the vicinity of the target set point thereof while keeping the DC components of the second and third bias control signals 372, 373 constant, and by recording in memory 354 values of the two DC signals $Uc_1$ and $Us_1$ for at least two values of the DC component of the first bias control signal 371, for example in the form of a set of triplets $(Uc_1, Us_1, S_{DC1})$ or $(Uc_1, Us_1, Vb_1)$.

In one embodiment the bias control module 353 of the controller 350, or the second channel logic thereof 512, may be configured to collect the second scan data by varying the DC component $S_{DC2}$ 552 of the second bias control signal 372 in the vicinity of the target set point thereof while keeping the DC components 551, 553 of the first and third bias control signals 371, 373 constant, and by recording in memory 354 values of the two second DC lock-in signals $Uc_2$ and $Us_2$ for at least two values of the DC component 352 of the second bias control signal 372, for example in the form of a set of triplets $(Uc_2, Us_2, S_{DC2})$ or $(Uc_2, Us_2, Vb_2)$.

The bias control module 353 of the controller 350 may be configured with the third channel logic 513 to collect the third scan data 523 by varying the DC component $S_{DC3}$ 553 of the third bias control signal 373 in the vicinity of the target set point thereof while keeping the DC components of the first and second bias control signals 371, 372 constant, and by recording in memory values of the two third quadrature lock-in signals $Uc_3$ and $Us_3$ for at least two values of the DC component of the third bias control signal 373, for example in the form of a set of triplets $(Uc_3, Us_3, S_{DC3})$ or $(Uc_3, Us_3, Vb_2)$.

The collection of the bias scan data 521, 522, and/or 523 described hereinabove may be performed in any order. Once the bias scan data 521, 522, and/or 523 are collected, the respective channel logic of the controller 350 may process each of them to obtain the corresponding slope information 531, 532, and/or 533, for example as described hereinabove with reference to step 235 of method 200.

In one embodiment, obtaining the slope information 531, 532, or 533 in the i-th feedback channel 501, 502, or 503, i=1, 2, or 3, may include estimating at least one of the slopes $a_{si}$ and $a_{ci}$ of the sine lock-in signals $Us_i$ and the cosine lock-in signals $Us_i$ versus the respective bias voltage Vbi, for example as described hereinabove with reference to step 234 of method 201 and equations (3)-(6). In one embodiment, only the sign of at least one of the slopes $a_{si}$ and $a_{ci}$ may be saved as the slope information.

Figure 6C:
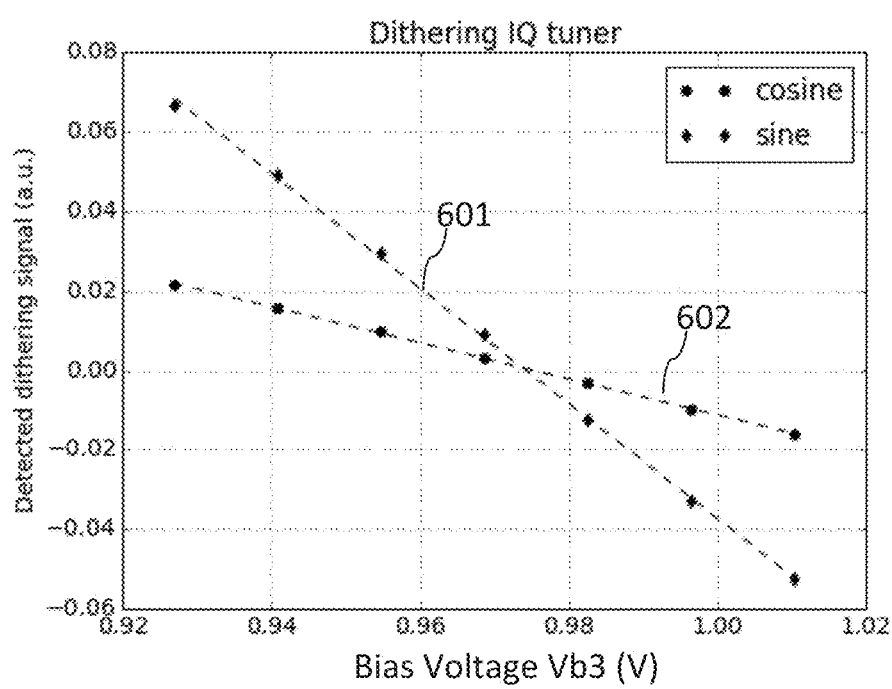
FIG. 6C is a graph illustrating bias scan data recorded from the output of the lock-in dither detector of the modulator apparatus of FIG. 3 versus the third bias voltage Vb3 controlling the IQ optical phase delay near its target set-point.

With reference to FIGS. 6A, 6B, and 6C, there are shown by way of example the values of the cosine (dots) and sine (diamonds) lock-in signals $Uc_i$ and $Us_i$ recorded from the output of the lock-in detector while varying the DC components of the three bias control signals in the vicinity of their respective target set points as described hereinabove. FIG. 6A illustrates the first bias scan data 521 for the first (I) optical modulator 321 obtained by scanning the bias voltage Vb1 of the first (I) modulator 321 and recording the sine and cosine DC lock-in signals for the first dither frequency $f_1$. FIG. 6B illustrates the second bias scan data 522 obtained by scanning the second bias voltage Vb2 of the second (Q) modulator 322 and recording the DC lock-in signals for the second dither frequency $f_2$. FIG. 6C illustrates the third bias scan data 523 obtained by scanning the IQ bias voltage Vb3 and recording the DC lock-in signals for the sum dither frequency $f_{sum}$. Each of the graphs also shows, with dashed lines, linear fits 601 and 602 to the recorded cosine and sine lock-in signals. In one embodiment the controller 350 may be configured to estimate, from the respective bias scan data, at least one of the slopes $a_{si}$ and $a_{ci}$ of these linear fits, i=1, 2, 3, and record them, or at least their signs, in memory as the respective first, second, and third slope information.

The first, second, and third slope information 531, 532, 533 recorded in memory 354 of the controller 350 may then be used by the respective channel logic of the controller during normal operation of the modulator device 300 to determine the direction in which the DC components of each of the bias control signals 371, 372, and 373 are to be changed to track changes in the corresponding target bias set-points thereof, generally as described hereinabove with reference to method 200 and FIGS. 1 and 2A. This may include monitoring the three feedback signals 341-343 during the device operation, or any sub-set of these signals, and adjusting the DC components of the corresponding bias control signals 371, 372, and/or 373 in a direction defined by the respective slope information 531, 532, or 533 and the current value of the respective feedback signal 341, 342, or 343.

Note that the process of bias tuning or tracking is substantially the same in all three bias control channels 501, 502, and 503, i.e., for the first, second, and third DC bias signals 551, 552, and 553, and may be as described hereinabove with reference to steps 235, 240 of method 200 of FIG. 2A and steps 230, 234 of FIG. 2B. Accordingly, the description hereinabove with reference to the operation of the controller 150 of the modulator device 110 at steps 230-240 applies to any of the three feedback channels associated with the three bias control signals 371, 372, and 373 of the modulator device 300.

In some embodiments the modulator device 300 may use the aforedescribed bias control method to control only one or two of the three bias control signals 371-373. For example, in one embodiment the controller 350 may apply the two dither signals 351, 352 to the bias electrodes of the inner modulators for controlling the IQ phase of the modulator by tracking the dither product signal, or the oscillation at the sum dither frequency $f_{sum}$, as described hereinabove, with the bias settings of the inner modulators controlled using a different bias control technique; in some embodiments the inner modulators may not require a bias control. In another embodiment the controller 350 may apply the two dither signals 351, 352 to the bias electrodes of the inner modulators for controlling their respective bias settings, while the IQ phase shift in the OMC 310 may be controlled using a different method. Accordingly, in some embodiments the controller 350 may be configured to implement any one, or any two, of the three feedback channels 501, 502, and 502.

It will be appreciated that the bias control technique described hereinabove with reference to the OMC 110 and OMC 310 by way of example may also be applicable to other optical modulating circuits including any number of waveguide optical modulators and any number of phase tuners to be controlled, using one or more suitably placed monitoring photodetectors followed by one or more phase-sensitive dither detectors, such as single-channel or multi-channel lock-in detectors.

Figure 7:
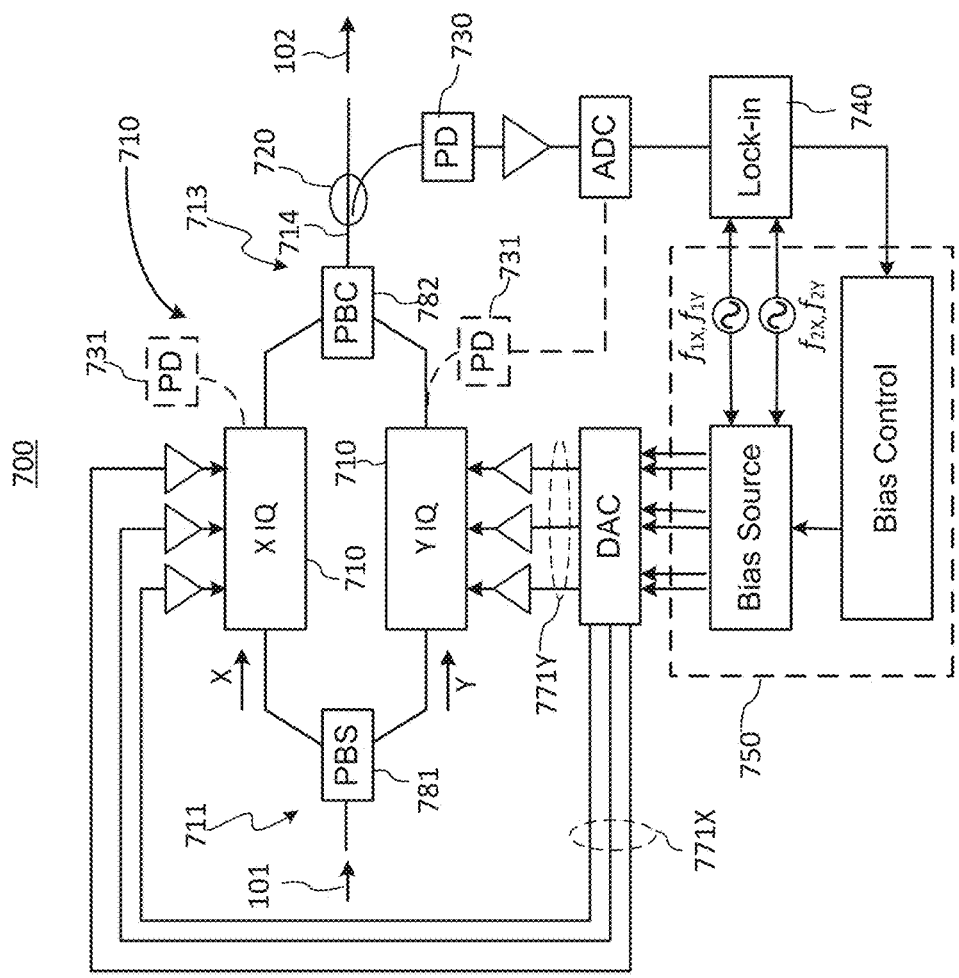
FIG. 7 is a schematic diagram of a modulator apparatus including a dual-polarization optical quadrature IQ modulator circuit and a multi-channel bias control circuit that incorporates a lock-in dither detector.

Referring to FIG. 7, there is illustrated an optical modulator apparatus 700 including an optical modulating circuit 710 in the form of a dual-polarization (DP) IQ modulator formed with two single-polarization optical modulators 710 connected in parallel between an input port 711 including a polarization beam splitter (PBS) 781, and an output port 713 including a polarization combiner 782. In operation input light 101 is split by PBS 781 into two orthogonal polarizations conventionally denoted as 'X' and 'Y', with light of the X polarization directed to pass through one of the two modulators 710, which may be referred to as the X modulator, and light of the Y polarization directed to pass through the other of the two modulators 710, which may be referred to as the Y modulator. Each of the X and Y optical modulators 710 may be embodied as the OMC 310 illustrated in FIG. 3, with the bias settings of the X modulator 710 being controlled by three bias controlled signals 771X and the bias settings of the Y modulator 710 being controlled by three bias controlled signals 771Y, each generally as described hereinabove with reference to FIG. 3.

Accordingly, in one embodiment the modulator device 700 may include two monitoring photodiodes 731, each of which disposed to receive light tapped from an output of the respective IQ modulator 710, with their respective biases independently controlled by two electrical feedback circuits (not shown), each of which may be implemented as described hereinabove with reference to FIGS. 3-6. The two electrical feedback circuits separately controlling the bias settings of each of the IQ modulators 710 may be implemented using a shared hardware processor or two or more separate hardware processors. In this embodiment, the electrical bias control circuits for each of the IQ modulators 710 may utilize the same two dither frequencies f1 and f2, or two different pairs of dither frequencies.

In another embodiment that is illustrated in FIG. 7, the bias signals 771X, 771Y of the OMC 710 may be controlled using a single monitoring PD 730 that is optically coupled at the output port 713 to receive light tapped from an output of the PBC 782, for example using a tap coupler 720. In this embodiment, a single bias control circuit that includes a multi-channel lock-in detector 740 and a controller 750 may be used to set, and dynamically tune, each of the bias control signals 771X, 771Y that control respective bias settings of the two IQ modulators 710. The lock-in detector 740 and the controller 750 may substantially combine functionalities of two lock-in detectors 340 and two controllers 350 of the bias control circuit 380 of the OMC 310 of FIG. 3, each of them operating generally as described hereinabove, with the lock-in detector 740 receiving its input from the PD 730, detecting respective dither tones in the received PD signal in a manner sensitive to the phase of the detected dither trace, and providing corresponding feedback signals in each channel to the controller 750, which in response may generate and/or adjusts the bias control signals 771X and 771Y. In this embodiment, the controller 750 may use two different pairs of dither frequencies, denoted in FIG. 7 as $f_{1X}$, $f_{2X}$ and $f_{1Y}$, $f_{2Y}$, to separately control the bias settings of the two IQ modulators 710, with all four dither frequencies being different and $(f_{1X}+f_{2X})\neq(f_{1Y}, f_{2Y})$ in order to enable separated detection of the dither frequencies and their sums in the electrical signal from the PD 730 by the lock-in detector 740.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

For example, in some embodiments of the OMC 310 of FIG. 3 additional monitoring PDs may be provided to directly monitor the optical transmission of each of the inner modulator 321, 322. These additional monitoring PDs (not shown) may be placed after a tap coupler directly after each of the inner modulators 321, 322 in their data paths, or on a drop port of the optical combiner of each of the inner MZMs. Furthermore, the monitoring PD 330 may be placed after the outer combiner 315 in the data path 316, or on a drop port of the outer combiner 315. Using two monitoring PDs disposed to receive light directly from the outputs of the inner modulators 321, 322, the bias signals 371, 372 of these modulators may be simultaneously scanned to determine their optimal settings. In embodiments where the drop port of an optical combiner is used for bias monitoring, a non-ideality of the combiner's phase response may potentially lead to a less accurate bias optimization, as the dither signal may disappear at different bias voltages in the main and drop ports of the combiner.

Figure 8A:
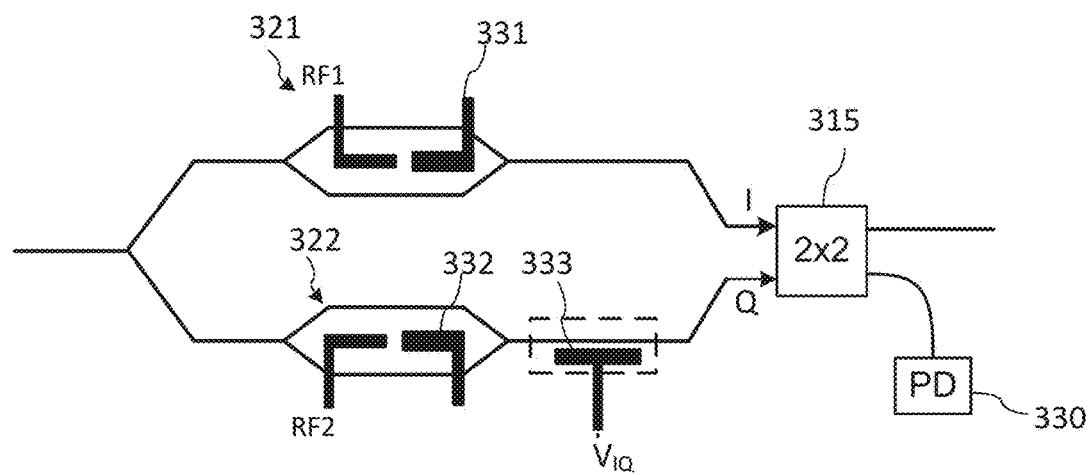
FIG. 8A is a schematic diagram of an embodiment of the OMC of FIG. 3 with each of the two inner optical modulators embodied as an MZM.
Figure 8B:
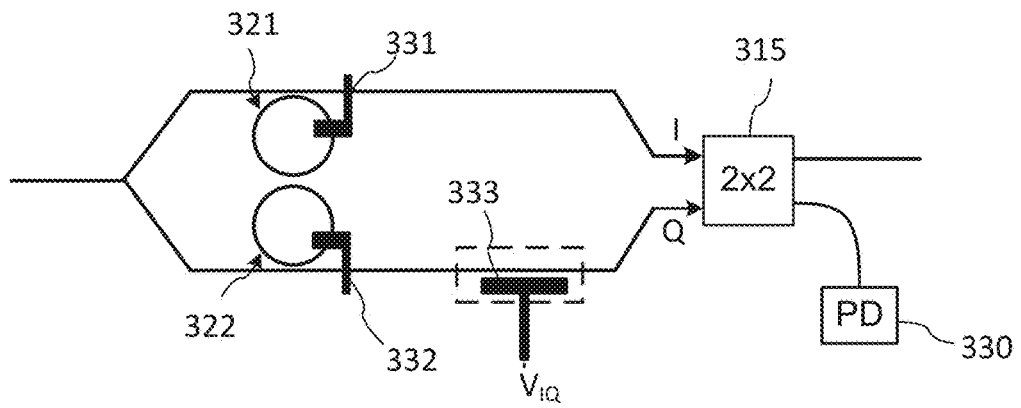
FIG. 8B is a schematic diagram of an embodiment of the OMC of FIG. 3 with each of the two inner optical modulators embodied as a micro-ring modulator.

Furthermore, each of the inner optical modulators 321, 322 of the OMC 310 of FIG. 3 may be implemented using a variety of modulating structures, such as but not exclusively in the form of an MZM, a micro-ring modulator, a micro-disk modulator, any other suitable interference-based modulator, or as an absorption modulator. FIGS. 8A and 8B illustrate exemplary embodiment of the OMC 310 with the inner optical modulators 321, 322 implemented as MZM modulators and micro-ring modulators, respectively. FIG. 8A also schematically illustrates RF electrodes disposed to implement phase modulators for modulating the optical phase of light propagating in the arms of the MZMs 321, 322 as known in the art.

Furthermore, the bias electrodes that implement phase tuners in each of the example embodiments described hereinabove may be configured in a variety of ways, and may be non-contiguous, i.e., including two or more separate electrode segments. In embodiments where a bias electrode implementing a phase tuner includes two separate segments, the DC component of the bias control signal and the corresponding dither signal may be applied to different segments of the bias electrode.

Furthermore, it will be appreciated that different electro-optic dielectric materials and semiconductor materials other than silicon, including but not limited to compound semiconductor materials of groups commonly referred to as A3B5 and A2B4, such as GaAs, InP, and their alloys and compounds, may be used to fabricate the optical modulator circuits example embodiments of which are described hereinabove. In another example, although example embodiments described hereinabove may have been described primarily with reference to an MZM modulator and a nested quadrature modulator, it will be appreciated that principles and device configurations described hereinabove with reference to specific examples may be adopted to perform an automatic bias control of optical waveguide modulators of other types, including single-sideband optical modulators.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

We claim:

1. A method for operating an optical modulator circuit (OMC) comprising an input optical port for receiving input light, an output optical port configured to provide output modulator light and tapped light, and one or more bias electrodes configured for controlling a modulator set point, the method comprising:
   a) providing light into the input port of the optical modulator circuit;
   b) providing one or more bias control signals to the one or more bias electrodes, the one or more bias control signals comprising a first DC bias signal and a first dither signal comprising a dither tone at a first dither frequency f1;
   c) providing the tapped light to a phase-sensitive dither detection circuit configured to detect an oscillation at the first dither frequency f1, or at a frequency related thereto, and to output two feedback signals that represent two quadrature components of the detected oscillation, the phase-sensitive dither detection circuit comprising a photodetector (PD) disposed to receive the tapped light;
   d) providing slope information that is indicative of a direction of change of the two feedback signals relative to a change in the first DC bias signal; and
   e) adjusting the first DC bias signal in a direction determined using the slope information.

2. The method of claim 1 further comprising:
   with the optical modulating circuit in operation,
   f) measuring the two feedback signals from the phase-sensitive detection circuit, and
   g) adjusting the first DC bias signal in a direction determined using the slope information and signs of the two feedback signals measured in (f).

3. The method of claim 2 wherein (d) comprises:
   d1) recording the two feedback signals for two or more values of the the first DC bias signal in a vicinity of a target set point thereof to collect bias scan data;

d2) processing the bias scan data to determine the slope information.

4. The method of claim 3 wherein the phase sensitive dither detection circuit comprises a lock-in detector configured to receive an electrical PD signal from the PD, and wherein:
(c) comprises: using the lock-in detector to detect the oscillation at the first dither frequency f1 or a frequency related thereto, and to obtain therefrom the two feedback signals comprising first and second DC lock-in signals that are responsive to an amplitude of the detected oscillation and the phase of the detected oscillation, and which represent the two quadrature components of the detected oscillation;
(d1) comprises recording values of the first and second DC lock-in signals for the two or more values of the first DC bias signal,
(d2) comprises determining, based on the values recorded in (d1), at least a sign of a slope of the first DC lock-in signal versus the first DC bias signal and a sign of a slope of the second DC lock-in signal versus the first DC bias signal, wherein the slope information comprises at least the signs of the slopes of the first and second DC lock-in signals.

5. The method of claim 4, wherein:
(f) comprises measuring current values of the first and second DC lock-in signals, and
(g) comprises determining the direction of adjusting the first DC bias signal based on the measured current values of the first and second DC lock-in signals weighted with the respective slopes.

6. The method of claim 5, wherein (g) comprises adjusting the first DC bias signal by an amount depending on a magnitude of at least one of the current values of the first and second DC lock-in signals.

7. A method for operating an optical modulator circuit (OMC) comprising a first optical modulator including a first bias electrode and a second optical modulator including a second bias electrode, wherein the first and second optical modulators are connected in parallel between the input optical port and the output optical port so as to form an outer Mach-Zehnder interferometer (MZI) structure comprising a third bias electrode, the method comprising:
providing light into an input port of the optical modulator circuit;
providing first, second, and third DC bias signals to the first, second, and third electrodes, respectively;
providing, to the first electrode, a first dither signal comprising a first dither tone at a first dither frequency f1;
providing, to the second electrode, a second dither tone at a second dither frequency f2 that is not equal to f1;
detecting a first oscillation at the first dither frequency and outputting a first feedback signal that is responsive to an amplitude and phase of the first oscillation;
detecting a second oscillation at the second dither frequency, and outputting a second feedback signal that is responsive to an amplitude and phase of the second oscillation;
varying the first DC bias signal in the vicinity of a target set point thereof while keeping the second DC bias signal constant, and recording the first feedback signal for two or more values of the first DC bias signal, and
varying the second DC bias signal in the vicinity of a target set point thereof while keeping the first DC bias signal constant, and recording the second feedback signal for two or more values of the second DC bias signal;
recording first slope information indicating a direction of change of the first feedback signal relative to a change in the first DC bias signal, and recording second slope information indicating a direction of change of the second feedback signal relative to a change in the second DC bias signal;
setting first and second DC bias signals at or near target set points thereof;
measuring the first and second feedback signals; and,
doing at least one of: adjusting the first DC bias signals in a direction determined using the first slope information and at least a sign of the first feedback signal, and adjusting the second DC bias signals in a direction determined using the second slope information and at least a sign of the second feedback signal.

8. A method for operating an optical modulator circuit (OMC) comprising a first optical modulator comprising a first bias electrode and a second optical modulator comprising a second bias electrode, wherein the first and second optical modulators are connected in parallel between the input optical port and the output optical port so as to form an outer Mach-Zehnder interferometer (MZI) structure comprising a third bias electrode, wherein:
providing light into an input port of the optical modulator circuit;
providing first, second, and third DC bias signal to the first, second, and third electrodes, respectively;
providing, to the first electrode, the first dither signal comprising a first dither tone at a first dither frequency f1;
providing, to the second electrode, a second dither tone at a second dither frequency f2;
detecting an oscillation at a sum dither frequency (f1+f2) in a phase-sensitive manner to obtain a feedback signal that is responsive to an amplitude and a phase of said oscillation;
varying the third DC bias signal in the vicinity of a target set point thereof while keeping the first and second DC bias signals constant, and recording the at least one feedback signal for two or more values of the third DC bias signal as the bias scan data;
extracting, from the bias scan data, the slope information indicating a direction of change of the feedback signal relative to a change in the third DC bias signal, and recording said slope information in memory; and
adjusting the third DC bias signal in a direction determined using the slope information.

* * * * *